(12) United States Patent
Hatada

(10) Patent No.: US 11,022,783 B2
(45) Date of Patent: Jun. 1, 2021

(54) ZOOM LENS AND IMAGE PICKUP APPARATUS

(71) Applicant: CANON KABUSHIKI KAISHA, Tokyo (JP)

(72) Inventor: Takahiro Hatada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 16/291,469

(22) Filed: Mar. 4, 2019

(65) Prior Publication Data

US 2019/0278068 A1 Sep. 12, 2019

(30) Foreign Application Priority Data

Mar. 8, 2018 (JP) .............................. JP2018-042214

(51) Int. Cl.
*G02B 15/16* (2006.01)

(52) U.S. Cl.
CPC ................................... *G02B 15/16* (2013.01)

(58) Field of Classification Search
CPC .. G02B 15/16; G02B 15/1461; G02B 15/173; G02B 27/646; G02B 15/20; G02B 15/143105
See application file for complete search history.

(56) References Cited

U.S. PATENT DOCUMENTS

| | | | |
|---|---|---|---|
| 9,268,118 B2 | 2/2016 | Sugita | |
| 9,453,992 B2 * | 9/2016 | Ito | ...................... H04N 5/23296 |
| 10,634,878 B2 * | 4/2020 | Ito | ........................ G02B 15/177 |
| 2013/0050844 A1 | 2/2013 | Li | |
| 2017/0003480 A1 | 1/2017 | Yamasaki | |
| 2017/0090166 A1 | 3/2017 | Morooka | |
| 2017/0201139 A1 | 7/2017 | Yamada et al. | |

FOREIGN PATENT DOCUMENTS

| | | |
|---|---|---|
| CN | 103309022 A | 9/2013 |
| CN | 106796339 A | 5/2017 |
| CN | 106814444 A | 6/2017 |

(Continued)

OTHER PUBLICATIONS

Intellectual Property Office; Canon Kabushiki Kaisha; c/o Canon Europe Limited; European Intellectual Property Group; 3 The Square; Stockley Park; Uxbridge; Middlesex; UB11 1ET; Aug. 27, 2019; pp. 1-5.

*Primary Examiner* — Tuyen Tra
(74) *Attorney, Agent, or Firm* — Canon U.S.A., Inc. IP Division

(57) ABSTRACT

Provided is a zoom lens including a plurality of lens units, which consist of, in order from an object side to an image side: a positive first lens unit; a negative second lens unit; and a rear lens group including a plurality of lens units and having a positive refractive power as a whole, the first lens unit including a negative lens G1$n$ arranged closest to the object side, and a plurality of positive lenses arranged on the image side of the negative lens, and the rear lens group includes a positive lens Grp. A lens unit arranged closest to the image side in the rear lens group includes the positive lens Grp. At this time, an Abbe number of the negative lens G1$n$, a refractive index of the positive lens Grp, and back focuses at a wide-angle end and a telephoto end, respectively, are appropriately set.

17 Claims, 11 Drawing Sheets

(56) References Cited

FOREIGN PATENT DOCUMENTS

| | | |
|---|---|---|
| JP | S61-062012 A | 3/1986 |
| JP | H08-094933 A | 4/1996 |
| JP | H11-295601 A | 10/1999 |
| JP | H11-305128 A | 11/1999 |
| JP | 2001-194590 A | 7/2001 |
| JP | 2013-44795 A | 3/2013 |
| JP | 2013-045039 A | 3/2013 |
| JP | 2013-190575 A | 9/2013 |
| JP | 2014-044249 A | 3/2014 |
| JP | 2016-166972 A | 9/2016 |
| JP | 2017-156719 A | 9/2017 |
| WO | 2016/031256 A1 | 3/2016 |
| WO | 2016/136878 A1 | 9/2016 |

\* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

It is required of a zoom lens used with an image pickup apparatus or other such apparatus to be compact and be capable of satisfactorily correcting various aberrations over the entire zoom range.

In U.S. Patent Application Publication No. 2013/0050844, there is described a zoom lens consisting of, in order from an object side to an image side: a first lens unit having a positive refractive power; a second lens unit having a negative refractive power; a third lens unit having a positive refractive power; and a fourth lens unit having a positive refractive power, the zoom lens having a relatively long back focus. In the zoom lens, chromatic aberration of magnification caused by the fourth lens unit at a wide-angle end is corrected through use of a low-refractive-index material as a material of a positive lens in the fourth lens unit, and chromatic aberration of magnification caused by the first lens unit at a telephoto end is corrected through appropriate selection of a material of a negative lens in the first lens unit.

When the zoom lens described in U.S. Patent Application Publication No. 2013/0050844 is to be further downsized, it is required to increase the refractive power of the first lens unit in order to reduce the back focus and an outer diameter of the zoom lens. The refractive power of the first lens unit can be increased by using a material having a smaller Abbe number as the material of the negative lens in the first lens unit. However, in the zoom lens described in U.S. Patent Application Publication No. 2013/0050844, when only the Abbe number of the material of the negative lens in the first lens unit is changed, it becomes difficult to correct chromatic aberration of magnification at the telephoto end.

SUMMARY OF THE INVENTION

According to one Example of the present invention, there is provided a zoom lens including a plurality of lens units, and having a configuration in which an interval between each pair of adjacent lens units is changed for zooming, the plurality of lens units consisting of, in order from an object side to an image side: a first lens unit having a positive refractive power; a second lens unit having a negative refractive power; and a rear lens group including a plurality of lens units and having a positive refractive power as a whole, the first lens unit being configured to move toward the object side for zooming from a wide-angle end to a telephoto end, the first lens unit including a negative lens arranged closest to the object side, and a plurality of positive lenses, which are arranged on the image side of the negative lens and are made of materials each having an Abbe number that is larger than an Abbe number of a material of the negative lens, the rear lens group including a lens unit that is arranged closest to the image side and includes a positive lens Grp, wherein the following conditional expressions:

$$15.00 < vd1n < 23.40;$$

$$1.70 < ndrp < 2.20; \text{ and}$$

$$1.50 < skt/skw < 2.60,$$

are satisfied where vd1n represents the Abbe number of the material of the negative lens, ndrp represents a refractive index of a material of the positive lens Grp with respect to a d-line, skw represents a back focus of the zoom lens at the wide-angle end, and skt represents a back focus of the zoom lens at the telephoto end.

Further features of the present invention will become apparent from the following description of exemplary embodiments with reference to the attached drawings.

DESCRIPTION OF THE EMBODIMENTS

Figure 1:
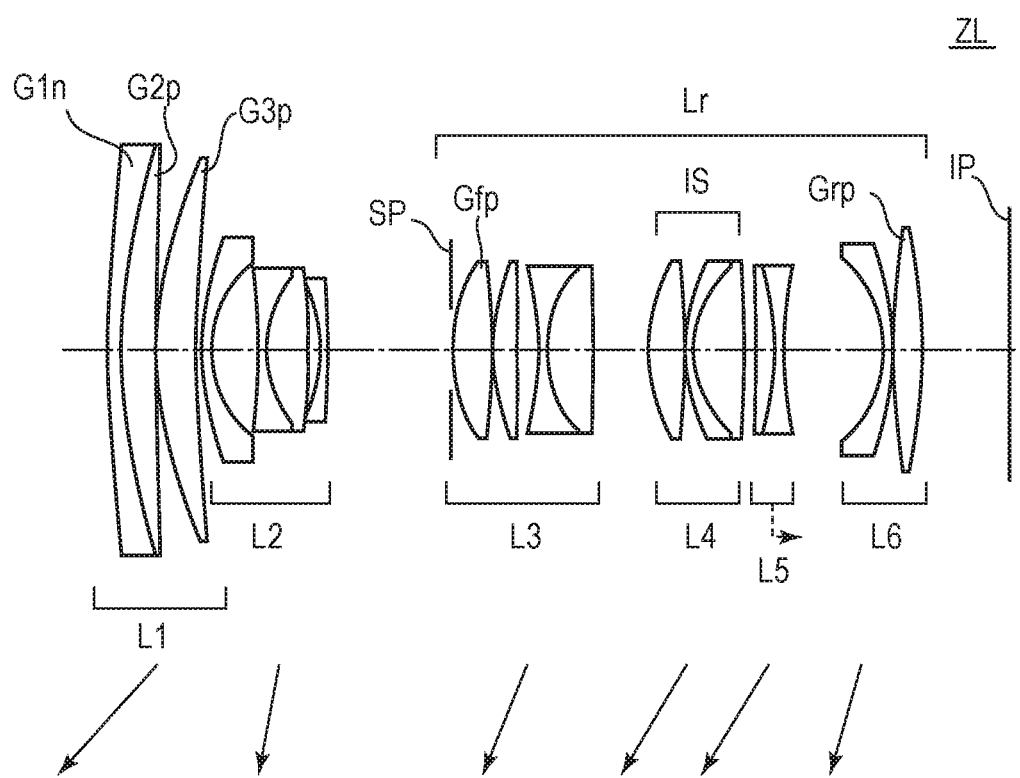
FIG. 1 is a cross-sectional view of a zoom lens according to Example 1 of the present invention.

Now, a zoom lens and an image pickup apparatus according to Examples of the present invention are described in detail with reference to the accompanying drawings.

[Examples of Optical System]

The zoom lens according to each of Examples is a photographing optical system used with a digital video camera, a digital camera, a silver-halide film camera, a television camera, or other image pickup apparatus. In cross-sectional views of FIG. 1, FIG. 3, FIG. 5, FIG. 7, and FIG. 9 of the zoom lens, the left side is an object side (front side), and the right side is an image side (rear side). Moreover, in the cross-sectional views, when the order of a lens unit from the object side to the image side is represented by i, the i-th lens unit is denoted as Li. Moreover, an aperture stop SP is configured to determine (restrict) a ray having a minimum F-number.

During focusing from an object at infinity to an object at a closest distance, a focus lens unit is configured to move as indicated by the broken-line arrow in the figures. For zooming from a wide-angle end to a telephoto end, the lens units are configured to move as indicated by the solid-line arrows in the figures, and an interval between each pair of adjacent lens units is changed.

When the zoom lens according to each of Examples is used with a digital video camera, a digital camera, or other such apparatus, an image plane IP corresponds to a CCD sensor, a CMOS sensor, or other such image pickup element (photoelectric conversion element). When the optical system in each of Examples is used with a silver-halide film camera, the image plane IP corresponds to a film surface.

FIG. 2A, FIG. 2B, FIG. 4A, FIG. 4B, FIG. 6A, FIG. 6B, FIG. 8A, FIG. 8B, FIG. 10A, and FIG. 10B are aberration diagrams of the optical systems in Examples. In spherical aberration diagrams, an F-number is represented by Fno. In the spherical aberration diagrams, the solid line indicates a d-line (wavelength: 587.6 nm), and the two-dot chain line indicates a g-line (wavelength: 435.8 nm). In astigmatism diagrams, a broken line M indicates a meridional image plane, and a solid line S indicates a sagittal image plane. Distortion is shown with respect to the d-line. Chromatic aberration of magnification is shown with respect to the g-line. A half angle of view (degrees) is represented by ω, and an F-number is represented by Fno.

In this specification, a lens unit may consist of a plurality of lenses, or of one lens. The wide-angle end means a zoom position at which a focal length of the zoom lens is the shortest, and the telephoto end means a zoom position at which the focal length of the zoom lens is the longest. A back focus is an air-equivalent distance on an optical axis from the last surface of the zoom lens to a paraxial image plane. A total lens length is a distance on the optical axis from the frontmost surface to the last surface of the zoom lens plus the back focus. An Abbe number vd of a material is expressed as vd=(Nd−1)/(NF−NC), where Ng, NF, Nd, and NC are refractive indices of the material with respect to the g-line (wavelength: 435.8 nm), an F-line (486.1 nm), the d-line (587.6 nm), and a C-line (656.3 nm), respectively.

The zoom lens according to each of Examples of the present invention includes a plurality of lens units, in which an interval between each pair of adjacent lens units is changed for zooming. Specifically, the plurality of lens units consist of, in order from the object side to the image side: a first lens unit having a positive refractive power; a second lens unit having a negative refractive power; and a rear lens group including a plurality of lens units and having a positive refractive power as a whole. For zooming from the wide-angle end to the telephoto end, the first lens unit is configured to move toward the object side. Further, the first lens unit includes a negative lens (hereinafter referred to as a negative lens G1n) arranged closest to the object side, and a plurality of positive lenses, which are arranged on the image side of the negative lens G1n and have an Abbe number that is larger than that of the negative lens G1n, and the rear lens group includes at least one positive lens. A lens unit arranged closest to the image side in the rear lens group includes a positive lens Grp. Further, the following conditional expressions (1) to (3) are satisfied.

$$15.00 < vd1n < 23.40 \quad (1)$$

$$1.70 < ndrp < 2.20 \quad (2)$$

$$1.50 < skt/skw < 2.60 \quad (3)$$

In the expressions, vd1n represents an Abbe number of a material of the negative lens G1n arranged closest to the object side in the first lens unit. Moreover, ndrp represents a refractive index of a material of the positive lens Grp with respect to the d-line. Further, skw represents a back focus of the zoom lens at the wide-angle end, and skt represents a back focus of the zoom lens at the telephoto end.

In the zoom lens, with the first lens unit consisting of the negative lens G1n and the plurality of positive lenses, the refractive power of the first lens unit is increased. As a result, a ray can be sufficiently converged on an incident side of the zoom lens, and an outer diameter of the zoom lens can be reduced. Further, the total lens length at the wide-angle end can be reduced.

With the first lens unit being configured to move toward the object side for zooming from the wide-angle end to the telephoto end, an interval between the first lens unit and the second lens unit becomes larger at the telephoto end than at the wide-angle end. As a result, at the telephoto end, at which a beam diameter of an axial ray becomes larger, a relatively long distance over which the axial ray that has exited the first lens unit is converged can be secured, and the rear lens group can be downsized.

The conditional expressions (1) to (3) indicate conditions for downsizing the zoom lens and satisfactorily correcting chromatic aberration of magnification over the entire zoom range. With the Abbe number of the negative lens G1n being relatively small to increase the refractive power of the first lens unit, the zoom lens is downsized. Although it becomes difficult to correct chromatic aberration of magnification caused by the first lens unit at the telephoto end with lenses in the first lens unit, with a relatively large difference between the back focuses at the wide-angle end and the telephoto end, a height of a peripheral ray of the axial ray passing through the lens unit that is arranged closest to the image side is reduced at the wide-angle end, to thereby reduce chromatic aberration of magnification at the wide-angle end. Further, with the positive lens Grp, which is made of a high-refractive-index material, being arranged in the lens unit arranged closest to the image side in the rear lens group, not only chromatic aberration of magnification at the wide-angle end but also chromatic aberration of magnification generated at the telephoto end can be corrected.

Now, the conditional expressions (1) to (3) are described.

The conditional expression (1) relates to the Abbe number of the negative lens G1n, and when the conditional expression (1) is satisfied, the downsizing and high performance of the zoom lens can both be achieved. When the Abbe number becomes smaller to fall below the lower limit value of the conditional expression (1), the material of the negative lens G1n becomes a high dispersion material, and it becomes disadvantageously difficult to correct chromatic aberration of magnification at the telephoto end. When the Abbe number becomes larger to exceed the upper limit value of the conditional expression (1), Abbe numbers of materials of the positive lenses and the material of the negative lens G1n of the first lens unit become closer to each other, and it becomes disadvantageously difficult to correct axial chromatic aberration at the telephoto end. Moreover, with the increased Abbe number of the material of the negative lens G1n, refractive powers of the lenses of the first lens unit become stronger, and hence it becomes disadvantageously difficult to correct spherical aberration at the telephoto end. Further, with the increased Abbe number of the material of the negative lens G1n, the lenses of the first lens unit become thicker in an optical axis direction, and it becomes disadvantageously difficult to reduce the total lens length especially at the wide-angle end.

The conditional expression (2) relates to the refractive index ndrp of the positive lens Grp, and when the conditional expression (2) is satisfied, small variations in various aberrations over the entire zoom range and high optical performance over the entire image plane can be obtained. When the refractive index of the material of the positive lens Grp becomes smaller to fall below the lower limit value of the conditional expression (2), the selectable material of the positive lens Grp is limited to a material that has low dispersion and too large anomalous dispersion, and it becomes disadvantageously difficult to cancel chromatic aberration of magnification generated by the first lens unit at the telephoto end. Further, with the reduced refractive index of the material of the positive lens Grp, it becomes difficult to correct a negative component of the Petzval sum, and curvature of field becomes disadvantageously excessive over the entire zoom range. When the refractive index of the material of the positive lens Grp becomes larger to exceed the upper limit value of the conditional expression (2), the selectable material of the positive lens Grp is limited to a material that has high dispersion and too large anomalous dispersion, and it becomes disadvantageously difficult to correct chromatic aberration of magnification generated by the first lens unit at the telephoto end.

The conditional expression (3) relates to a ratio between the back focus skw at the wide-angle end and the back focus skt at the telephoto end, and when the conditional expression (3) is satisfied, chromatic aberration of magnification can be satisfactorily corrected over the entire zoom range. When the ratio falls below the lower limit value of the conditional expression (3), an amount of change between a position of the positive lens Grp at the wide-angle end and a position of the positive lens Grp at the telephoto end becomes smaller. In other words, a difference between a height of the peripheral ray of the axial ray passing through the positive lens Grp at the wide-angle end and a height of the peripheral ray of the axial ray passing through the positive lens Grp at the telephoto end becomes smaller. Therefore, chromatic aberration of magnification is generated at the telephoto end and at the wide-angle end, and it becomes disadvantageously difficult to sufficiently correct chromatic aberration of magnification over the entire zoom range. When the ratio exceeds the upper limit value of the conditional expression (3), and the back focus at the telephoto end becomes longer, the total lens length becomes longer at the telephoto end, and it becomes disadvantageously difficult to downsize the zoom lens.

With the above-mentioned configuration and through the satisfaction of the conditional expressions, there can be obtained the zoom lens that is compact and is capable of correcting chromatic aberration of magnification over the entire zoom range.

It is preferred to set the numerical ranges of the conditional expressions (1) to (3) as follows.

$$17.00 < vd1n < 23.20 \quad (1a)$$

$$1.73 < ndrp < 2.15 \quad (2a)$$

$$1.60 < skt/skw < 2.55 \quad (3a)$$

It is more preferred to set the numerical ranges of the conditional expressions (1) to (3) as follows.

$$19.00 < vd1n < 22.90 \quad (1b)$$

$$1.75 < ndrp < 2.10 \quad (2b)$$

$$1.70 < skt/skw < 2.50 \quad (3b)$$

Further, it is preferred that the zoom lens according to each Example satisfy one or more of the following conditional expressions (4) to (14).

$$1.60 < nd1p < 2.00 \quad (4)$$

$$0.40 < vd1n/vdrp < 1.00 \quad (5)$$

$$0.80 < |f2|/skw < 1.80 \quad (6)$$

$$2.30 < f1/skt < 4.70 \quad (7)$$

$$0.40 < frp/ft < 1.40 \quad (8)$$

$$3.00 < (Fnot \times f1)/ft < 5.50 \quad (9)$$

$$0.50 < |f2|/fw < 1.00 \quad (10)$$

$$3.80 < Lt/skt < 7.60 \quad (11)$$

$$0.00 < (R1+R2)/(R1-R2) < 4.00 \quad (12)$$

$$73.00 < vfp < 100.00 \quad (13)$$

$$1.40 < ffp/fw < 2.00 \quad (14)$$

$$0.05 < Lrp/Lw < 0.20 \quad (15)$$

In the expressions, nd1p represents an average value of refractive indices of materials of the plurality of positive lenses in the first lens unit with respect to the d-line. Moreover, vdrp represents an Abbe number of a material of the positive lens Grp. Further, f1 represents a focal length of the first lens unit, f2 represents a focal length of the second lens unit, frp represents a focal length of the positive lens Grp, ft represents a focal length of the zoom lens at the telephoto end, and fw represents a focal length of the zoom lens at the wide-angle end. Fnot represents an F-number of the zoom lens at the telephoto end. Lt represents the total lens length of the zoom lens at the telephoto end. R1 represents a curvature radius of a lens surface on the object side of the positive lens Grp, and R2 represents a curvature radius of a lens surface on an image plane side of the positive lens Grp. Moreover, vfp represents an Abbe number of a positive lens Gfp arranged on the object side of the positive lens Grp, and ffp represents a focal length of the positive lens Gfp. Lrp represents a distance on the optical axis from the lens surface on the image side of the positive lens Grp to the image plane at the wide-angle end, and Lw represents the total lens length of the zoom lens at the wide-angle end. The distance on the optical axis from the lens surface on the image side of the positive lens Grp to the image plane is a distance obtained by adding, to a distance on the optical axis from the lens surface on the image side of the positive lens Grp to a lens surface closest to the image side of the zoom lens, the back focus of the zoom lens at the wide-angle end.

The conditional expression (4) relates to the average value of the refractive indices of the materials of the positive lenses in the first lens unit. When the average value nd1p of the refractive indices of the materials of the positive lenses in the first lens unit becomes smaller to fall below the lower limit value of the conditional expression (4), a height of a principal ray of an off-axial ray passing through the negative lens G1n becomes higher, and the negative lens G1n is increased in size in its radial direction. As a result, it becomes disadvantageously difficult to downsize the zoom lens. Further, when the average value nd1p of the refractive indices of the materials of the positive lenses in the first lens unit becomes smaller, and hence the refractive power of the first lens unit becomes smaller, it becomes disadvantageously difficult to reduce the total lens length. When the average value nd1p of the refractive indices of the materials of the positive lenses in the first lens unit becomes larger to exceed the upper limit value of the conditional expression (4), the selectable material of the positive lenses is limited to a high dispersion material. Therefore, it becomes disadvantageously difficult to correct axial chromatic aberration and chromatic aberration of magnification generated by the first lens unit at the telephoto end.

The conditional expression (5) relates to a ratio between the Abbe numbers of the materials of the negative lens G1n and the positive lens Grp. When the ratio falls below the lower limit value of the conditional expression (5), and the Abbe number of the positive lens Grp becomes larger, the selectable material of the positive lens Grp is limited to a material that has too large anomalous dispersion. Therefore, it becomes disadvantageously difficult to correct axial chromatic aberration and chromatic aberration of magnification generated by the first lens unit at the telephoto end. Further, when the ratio falls below the lower limit value of the conditional expression (5), and the Abbe number of the positive lens Grp becomes larger, the selectable material of the positive lens Grp is limited to a material having a low refractive index, with the result that it becomes difficult to correct the negative component of the Petzval sum, and that curvature of field becomes disadvantageously excessive over the entire zoom range. When the ratio exceeds the upper limit value of the conditional expression (5), and the Abbe number of the positive lens Grp becomes smaller, the selectable material of the positive lens Grp is limited to a material that has too large anomalous dispersion. Therefore, it becomes disadvantageously difficult to correct axial chromatic aberration and chromatic aberration of magnification generated by the first lens unit at the telephoto end.

The conditional expression (6) relates to a ratio of the focal length of the second lens unit to the back focus at the wide-angle end. When the ratio falls below the lower limit value of the conditional expression (6), the focal length of the second lens unit becomes shorter (absolute value of the focal length becomes smaller), and the negative refractive power becomes stronger, variations in spherical aberration and chromatic aberration of magnification accompanying zooming become disadvantageously larger. When the ratio exceeds the upper limit value of the conditional expression (6), the focal length of the second lens unit becomes longer (absolute value of the focal length becomes larger), and the negative refractive power of the second lens unit becomes weaker, it becomes difficult for the zoom lens to have retrofocus type refractive power arrangement. As a result, it becomes disadvantageously difficult to increase an image pickup angle of view at the wide-angle end.

The conditional expression (7) relates to a ratio of the focal length of the first lens unit to the back focus at the telephoto end. When the ratio falls below the lower limit value of the conditional expression (7), the focal length of the first lens unit becomes shorter, and the refractive power of the first lens unit becomes stronger, it becomes disadvantageously difficult to correct spherical aberration at the telephoto end. When the ratio exceeds the upper limit value of the conditional expression (7), the focal length of the first lens unit becomes longer, and the positive refractive power of the first lens unit becomes weaker, a movement amount of the first lens unit becomes larger for zooming. As a result, the total lens length of the zoom lens becomes disadvantageously longer at the telephoto end. Further, with the weak positive refractive power of the first lens unit, the height of the principal ray of the off-axial ray passing through the negative lens G1n becomes higher, and the negative lens G1n is increased in size in the radial direction. As a result, it becomes disadvantageously difficult to downsize the zoom lens.

The conditional expression (8) relates to a ratio of the focal length of the positive lens Grp to the focal length of the zoom lens at the telephoto end. When the ratio falls below the lower limit value of the conditional expression (8), the focal length of the positive lens Grp becomes shorter, and the refractive power of the positive lens Grp becomes stronger, it becomes disadvantageously difficult to correct curvature of field and distortion at the wide-angle end. When the ratio exceeds the upper limit value of the conditional expression (8), the focal length of the positive lens Grp becomes longer, and the refractive power of the positive lens Grp becomes weaker, it becomes disadvantageously difficult to correct chromatic aberration of magnification at the telephoto end.

The conditional expression (9) relates to a ratio of a value obtained by multiplying the F-number and the focal length of the first lens unit to the focal length of the zoom lens at the telephoto end. When the conditional expression (9) is satisfied, there can be obtained the zoom lens, which has a relatively small F-number and a short total lens length, and which is reduced in spherical aberration over the entire zoom range. When the ratio falls below the lower limit value of the conditional expression (9), the focal length of the first lens unit becomes shorter, and the refractive power of the first lens unit becomes stronger, it becomes disadvantageously difficult to correct spherical aberration at the telephoto end. When the ratio exceeds the upper limit value of the conditional expression (9), the focal length of the first lens unit becomes longer, and the positive refractive power of the first lens unit becomes weaker, the movement amount of the first lens unit for zooming becomes larger. As a result, the total lens length of the zoom lens becomes disadvantageously longer at the telephoto end. Further, with the weak positive refractive power of the first lens unit, the height of the principal ray of the off-axial ray passing through the negative lens G1n becomes higher, and the negative lens Gln is increased in size in the radial direction. As a result, it becomes disadvantageously difficult to downsize the zoom lens.

The conditional expression (10) relates to a ratio of the focal length of the second lens unit to the focal length of the zoom lens at the wide-angle end. When the ratio falls below the lower limit value of the conditional expression (10), the focal length of the second lens unit becomes shorter (absolute value of the focal length becomes smaller), and the negative refractive power of the second lens unit becomes stronger, it becomes disadvantageously difficult to reduce variations in spherical aberration and chromatic aberration of magnification accompanying zooming. When the ratio exceeds the upper limit value of the conditional expression (10), the focal length of the second lens unit becomes longer (absolute value of the focal length becomes larger), and the negative refractive power of the second lens unit becomes weaker, it becomes difficult for the zoom lens to have retrofocus type refractive power arrangement. As a result, it becomes disadvantageously difficult to increase the image pickup angle of view at the wide-angle end.

The conditional expression (11) relates to a ratio of the total lens length at the telephoto end to the back focus at the telephoto end. When the ratio falls below the lower limit value of the conditional expression (11), and the back focus at the telephoto end becomes longer, the total lens length becomes longer at the telephoto end, and the zoom lens is disadvantageously increased in size. When the ratio exceeds the upper limit value of the conditional expression (11), and the back focus at the telephoto end becomes shorter, the height of the peripheral ray of the axial ray passing through the positive lens Grp at the telephoto end becomes lower than that in the case where the conditional expression (11) is satisfied. As a result, it becomes disadvantageously difficult to correct chromatic aberration of magnification at the telephoto end.

The conditional expression (12) relates to a shape factor of the positive lens Grp. When the ratio falls below the lower limit of the conditional expression (12), and the curvature radius of the lens surface on the object side of the positive lens Grp becomes smaller than the curvature radius of the lens surface on the image side, it becomes disadvantageously difficult to correct curvature of field at the wide-angle end. When the ratio exceeds the upper limit value of the conditional expression (12), and the curvature radius of the lens surface on the image side becomes smaller, it becomes disadvantageously difficult to correct spherical aberration at the telephoto end.

The conditional expression (13) relates to the Abbe number of the positive lens Gfp in the rear lens group, and when the conditional expression (13) is satisfied, axial chromatic aberration can be satisfactorily corrected at the telephoto end, and chromatic aberration of magnification can be satisfactorily corrected at the wide-angle end. When the Abbe number of the positive lens Gfp becomes smaller to fall below the lower limit value of the conditional expression (13), it becomes disadvantageously difficult to correct axial chromatic aberration at the telephoto end, and to correct chromatic aberration of magnification at the wide-angle end. When the Abbe number of the positive lens Gfp becomes larger to exceed the upper limit value of the conditional expression (13), axial chromatic aberration is overcorrected at the telephoto end, and as a result, axial chromatic aberration becomes disadvantageously larger at the telephoto end. The conditional expression (14) relates to the focal length of the positive lens Gfp. When the ratio falls below the lower limit value of the conditional expression (14), the focal length of the positive lens Gfp becomes shorter, and the refractive power of the positive lens Gfp becomes stronger, it becomes disadvantageously difficult to correct spherical aberration at the telephoto end. When the ratio exceeds the upper limit value of the conditional expression (14), the focal length of the positive lens Gfp becomes longer, and the refractive power of the positive lens Gfp becomes weaker, it becomes disadvantageously difficult to correct axial chromatic aberration at the telephoto end, and to correct chromatic aberration of magnification at the wide-angle end.

The conditional expression (15) indicates that the positive lens Grp is arranged in the vicinity of the image plane, at which the height of the peripheral ray of the axial ray becomes lower, at the wide-angle end. When the ratio falls below the lower limit value of the conditional expression (15), and the position of the positive lens Grp becomes closer to the image plane, the positive lens Grp is disadvantageously increased in size in the radial direction. When the ratio exceeds the upper limit value of the conditional expression (15), and the position of the positive lens Grp is moved away from the image plane, the height of the peripheral ray of the axial ray passing through the positive lens Grp becomes higher, and it becomes disadvantageously difficult to correct chromatic aberration of magnification at the wide-angle end.

When there are a plurality of positive lenses that satisfy the conditional expression (15), the positive lens Grp is a positive lens made of a material having the largest refractive index.

It is preferred to set the numerical ranges of the conditional expressions (4) to (15) as follows.

$$1.62 < nd1p < 1.90 \tag{4a}$$

$$0.43 < vd1n/vdrp < 0.98 \tag{5a}$$

$$0.90 < |f2|/skw < 1.70 \tag{6a}$$

$$2.50 < f1/skt < 4.50 \tag{7a}$$

$$0.45 < frp/ft < 1.30 \tag{8a}$$

$$3.20 < (Fnot \times f1)/ft < 5.20 \tag{9a}$$

$$0.60 < |f2|/fw < 0.90 \tag{10a}$$

$$4.20 < Lt/skt < 7.10 \tag{11a}$$

$$0.05 < (R1+R2)/(R1-R2) < 3.50 \tag{12a}$$

$$73.50 < vfp < 98.00 \tag{13a}$$

$$1.45 < ffp/fw < 1.90 \tag{14a}$$

$$0.06 < Lrp/Lw < 0.17 \tag{15a}$$

It is more preferred to set the numerical ranges of the conditional expressions (4) to (15) as follows.

$$1.63 < nd1p < 1.85 \tag{4b}$$

$$0.45 < vd1n/vdrp < 0.95 \tag{5b}$$

$$1.00 < |f2|/skw < 1.60 \tag{6b}$$

$$2.60 < f1/skt < 4.20 \tag{7b}$$

$$0.50 < frp/ft < 1.25 \tag{8b}$$

$$3.30 < (Fnot \times f1)/ft < 5.00 \tag{9b}$$

$$0.65 < |f2|/fw < 0.85 \tag{10b}$$

$$4.50 < Lt/skt < 6.80 \tag{11b}$$

$$0.10 < (R1+R2)/(R1-R2) < 3.0 \tag{12b}$$

$$74.00 < vfp < 96.00 \tag{13b}$$

$$1.50 < ffp/fw < 1.85 \tag{14b}$$

$$0.07 < Lrp/Lw < 0.15 \tag{15b}$$

When at least one of the above-mentioned conditional expressions is satisfied, the zoom lens can be downsized, and chromatic aberration of magnification can be satisfactorily corrected over the entire zoom range.

Now, the zoom lenses according to Examples of the present invention are described.

Example 1

Figure 2A:
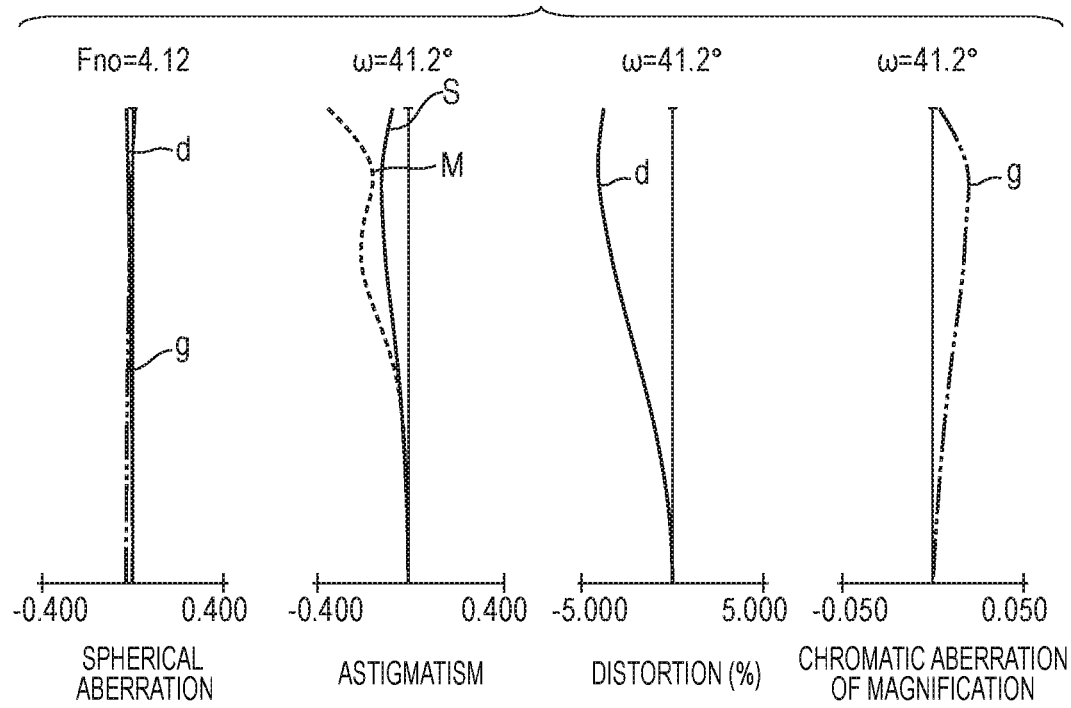
FIG. 2A is an aberration diagram of the zoom lens according to Example 1 when focused at infinity at a wide-angle end.
Figure 2B:
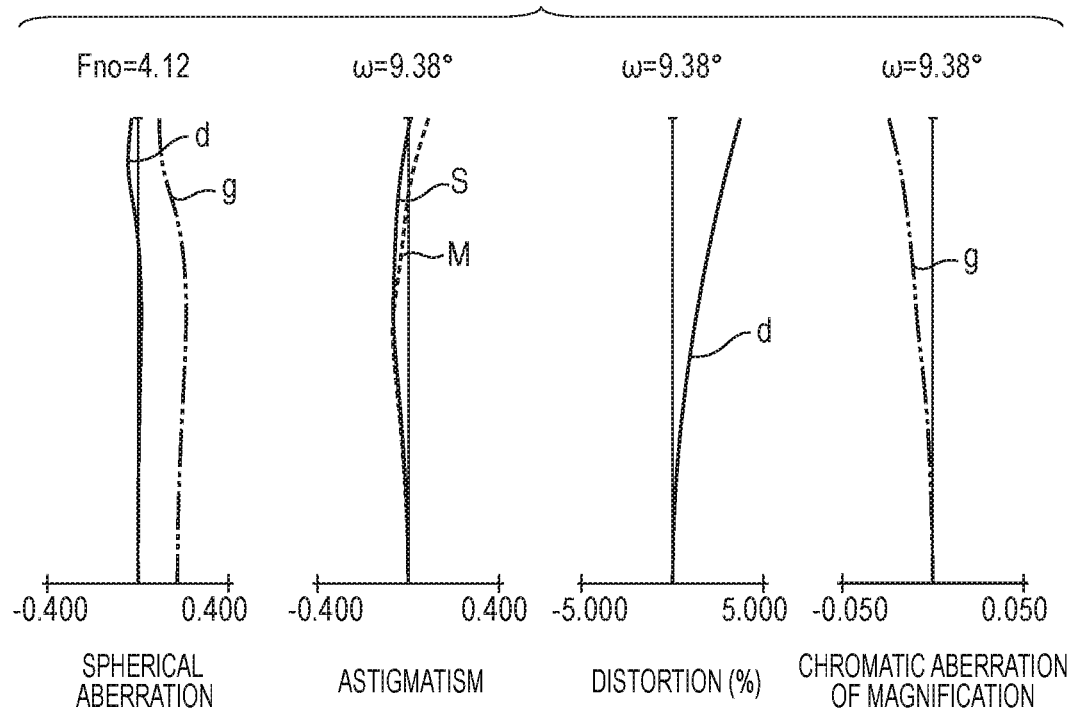
FIG. 2B is an aberration diagram of the zoom lens according to Example 1 when focused at infinity at a telephoto end.

FIG. 1 is a cross-sectional view of a zoom lens ZL according to Example 1 of the present invention, FIG. 2A is an aberration diagram of the zoom lens ZL when the zoom lens ZL is focused at infinity at the wide-angle end, and FIG. 2B is an aberration diagram of the zoom lens ZL when the zoom lens ZL is focused at infinity at the telephoto end.

The zoom lens ZL according to Example 1 consists of, in order from the object side to the image side: a first lens unit L1 having a positive refractive power; a second lens unit L2 having a negative refractive power; a third lens unit L3 having a positive refractive power; a fourth lens unit L4 having a positive refractive power; a fifth lens unit L5 having a negative refractive power; and a sixth lens unit L6 having a negative refractive power. The aperture stop SP is arranged closest to the object side in the third lens unit.

Specifically, for zooming from the wide-angle end to the telephoto end, all the lens units are configured to move toward the object side. During the zooming, an interval between the first lens unit L1 and the second lens unit L2 is increased, an interval between the second lens unit L2 and the third lens unit L3 is reduced, an interval between the third lens unit L3 and the fourth lens unit L4 is reduced, an interval between the fourth lens unit L4 and the fifth lens unit L5 is increased, and an interval between the fifth lens unit L5 and the sixth lens unit L6 is increased.

During focusing from the object at infinity to the object at the closest distance, the fifth lens unit L5 is configured to move toward the image side. During image blur correction, the fourth lens unit L4 is configured to move in a direction containing a component in a direction perpendicular to the optical axis.

The first lens unit L1 consists of, in order from the object side to the image side, the negative lens G1n, a positive lens G2p, and a positive lens G3p. The positive lens Gfp is a lens arranged adjacent to, and on the image side of, the stop, and the positive lens Grp is a lens arranged closest to the image side in the zoom lens ZL.

With the above-mentioned configuration, there can be obtained the zoom lens that is compact and is capable of correcting chromatic aberration of magnification over the entire zoom range as illustrated in the aberration diagrams of FIG. 2A and FIG. 2B.

Example 2

Figure 3:
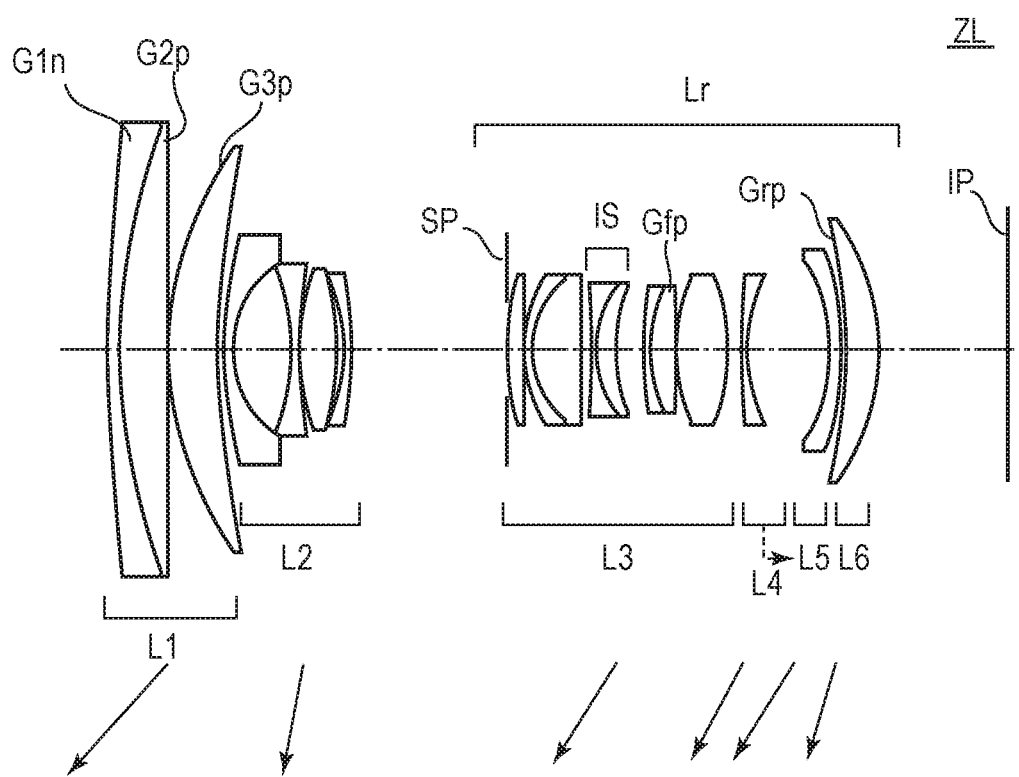
FIG. 3 is a cross-sectional view of a zoom lens according to Example 2 of the present invention.
Figure 4A:
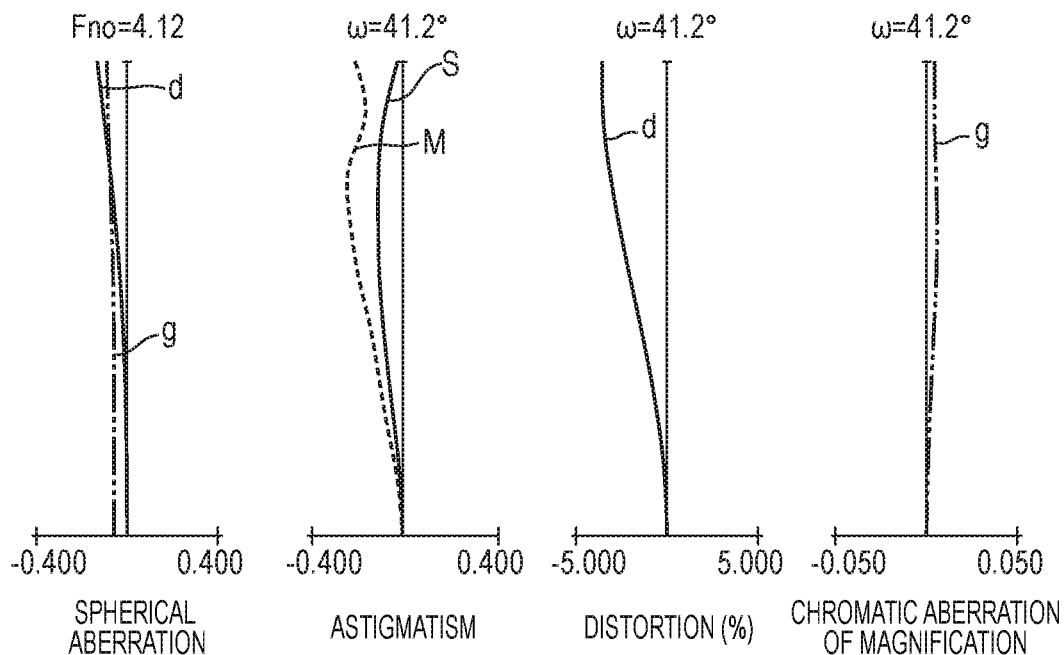
FIG. 4A is an aberration diagram of the zoom lens according to Example 2 when focused at infinity at a wide-angle end.
Figure 4B:
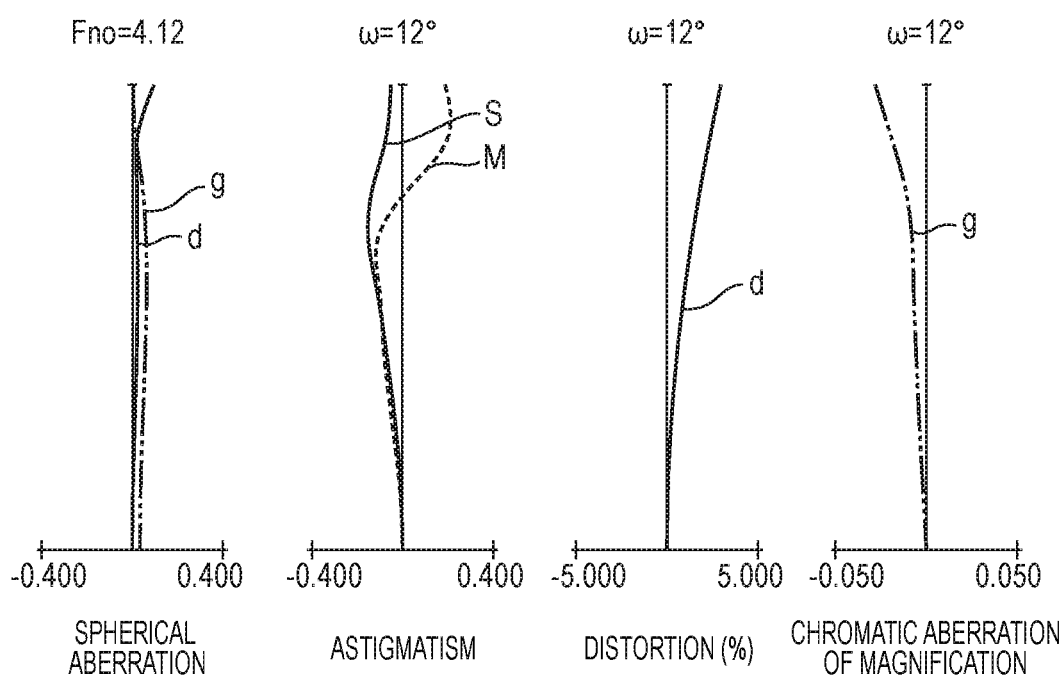
FIG. 4B is an aberration diagram of the zoom lens according to Example 2 when focused at infinity at a telephoto end.

FIG. 3 is a cross-sectional view of a zoom lens ZL according to Example 2 of the present invention, FIG. 4A is an aberration diagram of the zoom lens ZL when the zoom lens ZL is focused at infinity at the wide-angle end, and FIG. 4B is an aberration diagram of the zoom lens ZL when the zoom lens ZL is focused at infinity at the telephoto end.

The zoom lens ZL according to Example 2 consists of, in order from the object side to the image side: a first lens unit L1 having a positive refractive power; a second lens unit L2 having a negative refractive power; a third lens unit L3 having a positive refractive power; a fourth lens unit L4 having a negative refractive power; a fifth lens unit L5 having a negative refractive power; and a sixth lens unit L6 having a positive refractive power. The aperture stop SP is arranged closest to the object side in the third lens unit.

Specifically, for zooming from the wide-angle end to the telephoto end, all the lens units are configured to move toward the object side. During the zooming, an interval between the first lens unit L1 and the second lens unit L2 is increased, an interval between the second lens unit L2 and the third lens unit L3 is reduced, an interval between the third lens unit L3 and the fourth lens unit L4 is increased, an interval between the fourth lens unit L4 and the fifth lens unit L5 is reduced, and an interval between the fifth lens unit L5 and the sixth lens unit L6 is increased.

During focusing from the object at infinity to the object at the closest distance, the fourth lens unit L4 is configured to move toward the image side. During image blur correction, a subunit IS of the third lens unit L3 is configured to move in a direction containing a component in a direction perpendicular to the optical axis.

The first lens unit L1 consists of, in order from the object side to the image side, the negative lens G1n, the positive lens G2p, and the positive lens G3p. The positive lens Gfp is a lens arranged adjacent to, and on the image side of, the subunit IS, and the positive lens Grp is a lens arranged closest to the image side in the zoom lens ZL.

With the above-mentioned configuration, there can be obtained the zoom lens that is compact and is capable of correcting chromatic aberration of magnification over the entire zoom range as illustrated in the aberration diagrams of FIG. 4A and FIG. 4B.

Example 3

Figure 5:
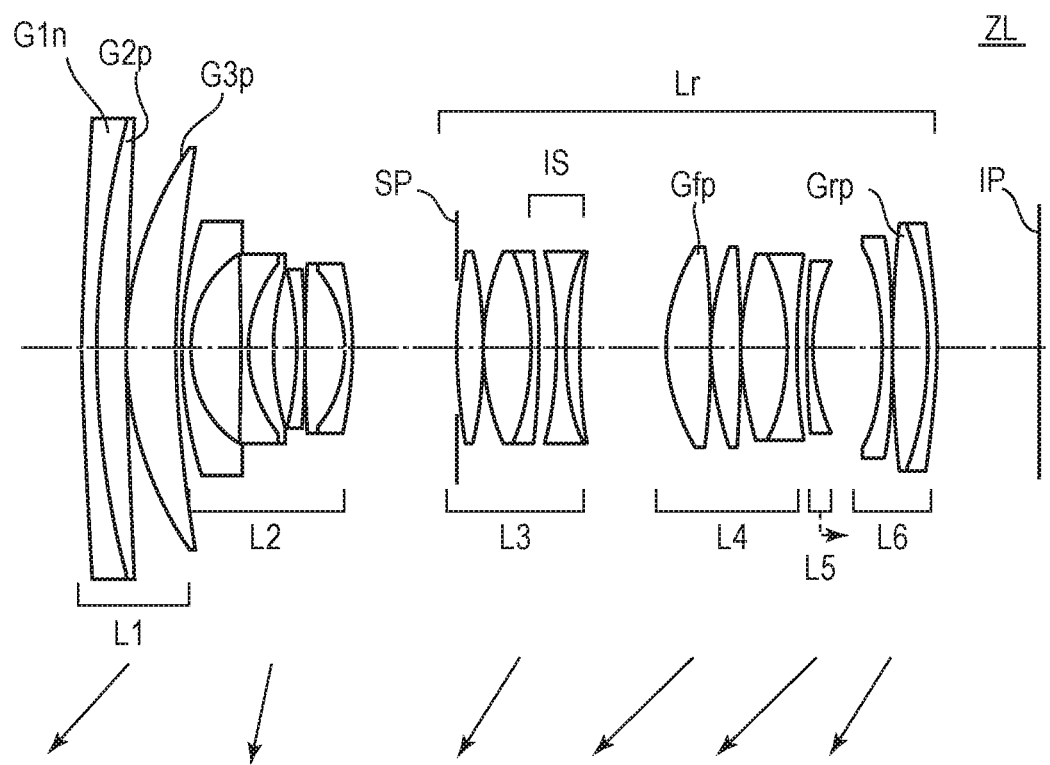
FIG. 5 is a cross-sectional view of a zoom lens according to Example 3 of the present invention.
Figure 6A:
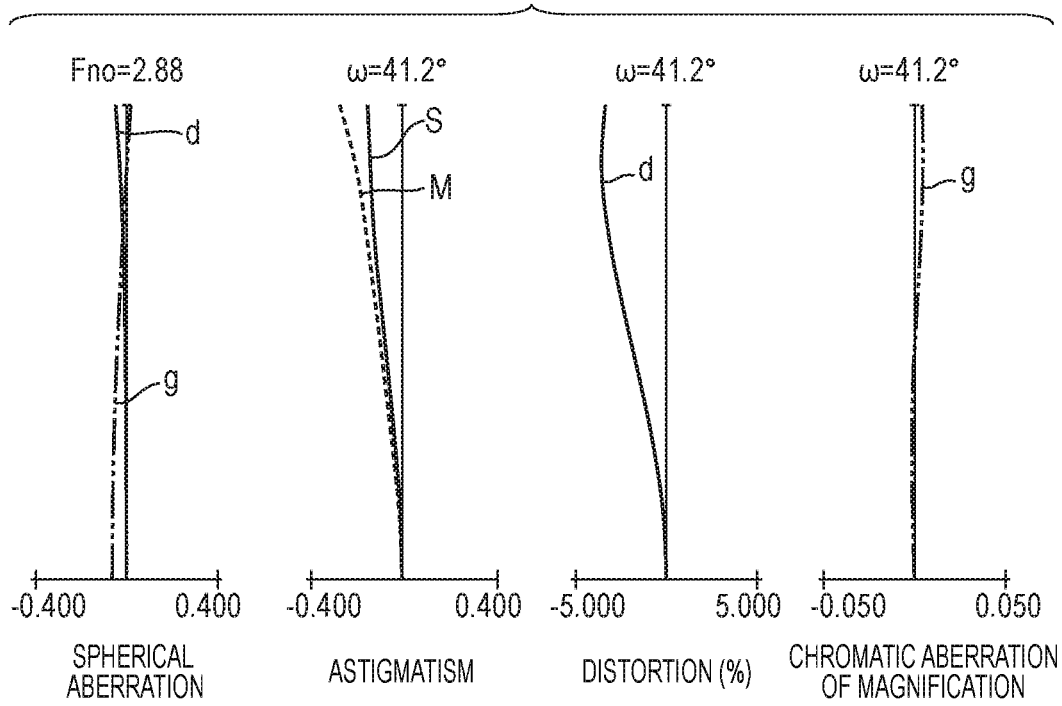
FIG. 6A is an aberration diagram of the zoom lens according to Example 3 when focused at infinity at a wide-angle end.
Figure 6B:
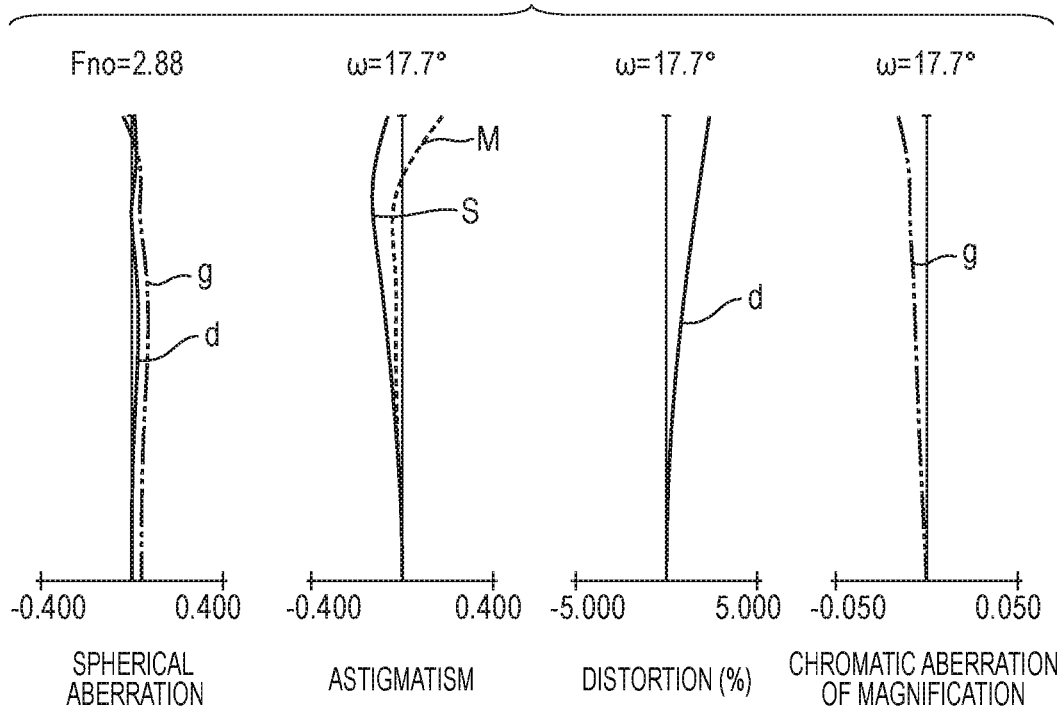
FIG. 6B is an aberration diagram of the zoom lens according to Example 3 when focused at infinity at a telephoto end.

FIG. 5 is a cross-sectional view of a zoom lens ZL according to Example 3 of the present invention, FIG. 6A is an aberration diagram of the zoom lens ZL when the zoom lens ZL is focused at infinity at the wide-angle end, and FIG. 6B is an aberration diagram of the zoom lens ZL when the zoom lens ZL is focused at infinity at the telephoto end.

The zoom lens ZL according to Example 3 consists of, in order from the object side to the image side: a first lens unit L1 having a positive refractive power; a second lens unit L2 having a negative refractive power; a third lens unit L3 having a positive refractive power; a fourth lens unit L4 having a positive refractive power; a fifth lens unit L5 having a negative refractive power; and a sixth lens unit L6 having a positive refractive power. The aperture stop SP is arranged closest to the object side in the third lens unit.

Specifically, for zooming from the wide-angle end to the telephoto end, all the lens units are configured to move toward the object side. During the zooming, an interval between the first lens unit L1 and the second lens unit L2 is increased, an interval between the second lens unit L2 and the third lens unit L3 is reduced, an interval between the third lens unit L3 and the fourth lens unit L4 is reduced, an interval between the fourth lens unit L4 and the fifth lens unit L5 is reduced, and an interval between the fifth lens unit L5 and the sixth lens unit L6 is increased.

During focusing from the object at infinity to the object at the closest distance, the fifth lens unit L5 is configured to move toward the image side. During image blur correction, a subunit IS of the third lens unit L3 is configured to move in a direction containing a component in a direction perpendicular to the optical axis.

The first lens unit L1 consists of, in order from the object side to the image side, the negative lens G1n, the positive lens G2p, and the positive lens G3p. The positive lens Gfp is a lens arranged adjacent to, and on the image side of, the subunit IS, and the positive lens Grp is a lens arranged second closest to the image side in the zoom lens ZL.

With the above-mentioned configuration, there can be obtained the zoom lens that is compact and is capable of correcting chromatic aberration of magnification over the entire zoom range as illustrated in the aberration diagrams of FIG. 6A and FIG. 6B.

Example 4

Figure 7:
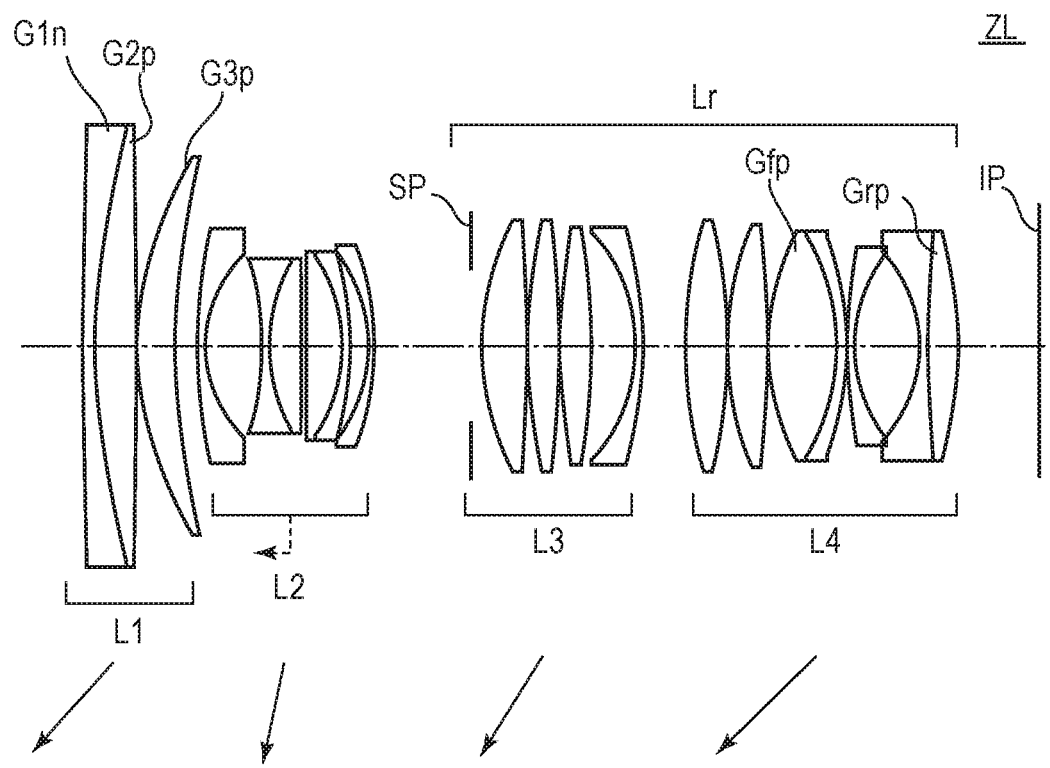
FIG. 7 is a cross-sectional view of a zoom lens according to Example 4 of the present invention.
Figure 8A:
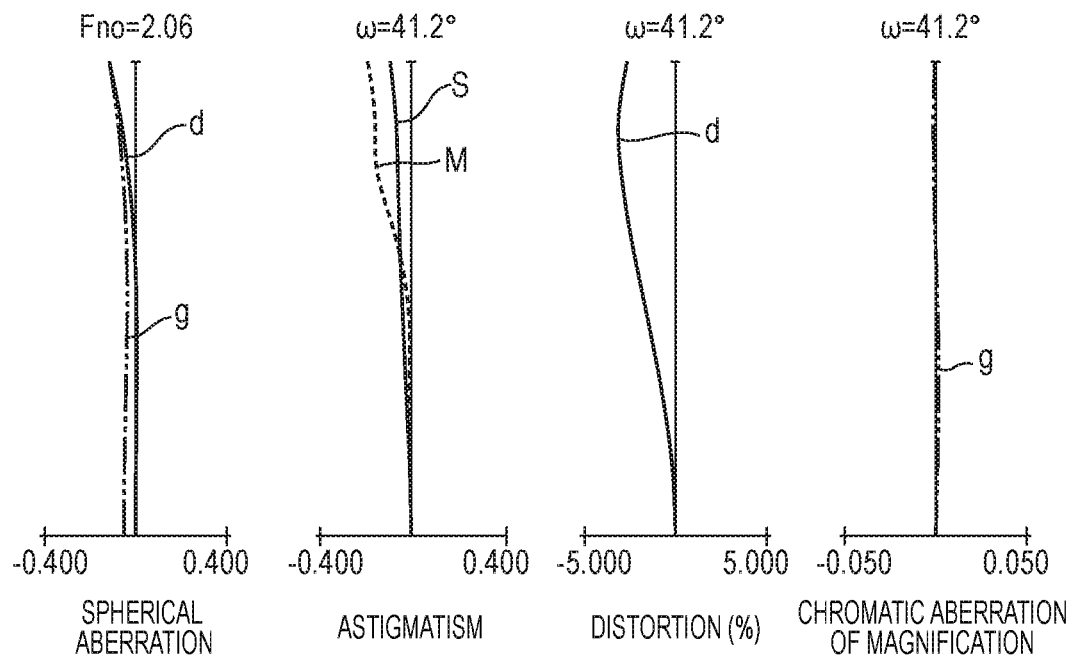
FIG. 8A is an aberration diagram of the zoom lens according to Example 4 when focused at infinity at a wide-angle end.
Figure 8B:
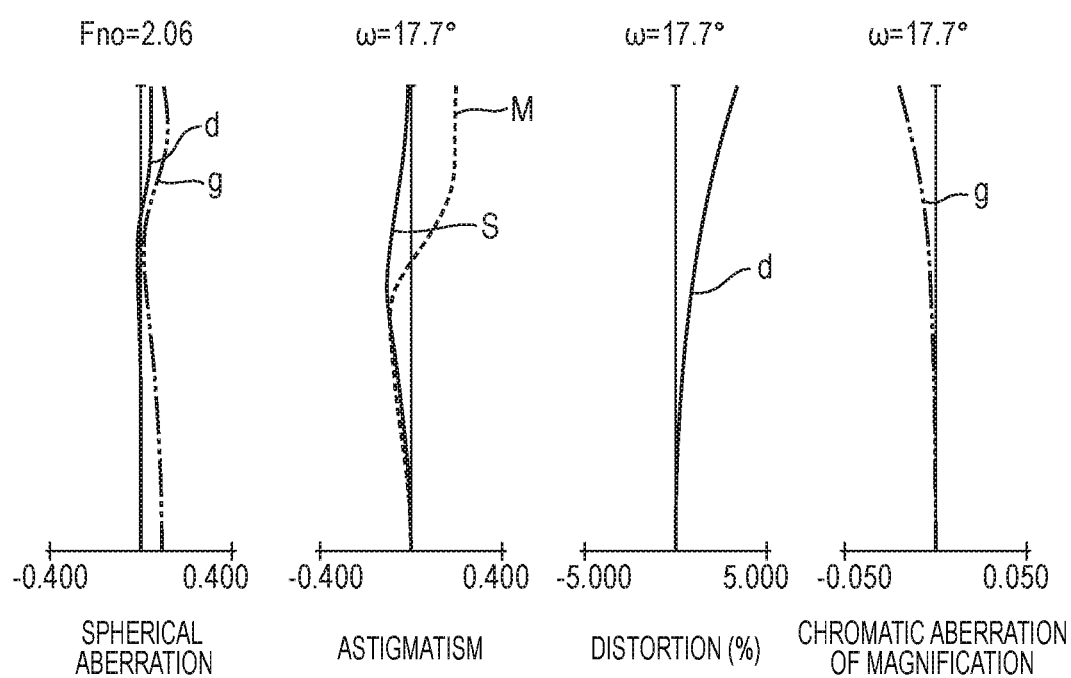
FIG. 8B is an aberration diagram of the zoom lens according to Example 4 when focused at infinity at a telephoto end.

FIG. 7 is a cross-sectional view of a zoom lens ZL according to Example 4 of the present invention, FIG. 8A is an aberration diagram of the zoom lens ZL when the zoom lens ZL is focused at infinity at the wide-angle end, and FIG. 8B is an aberration diagram of the zoom lens ZL when the zoom lens ZL is focused at infinity at the telephoto end.

The zoom lens ZL according to Example 4 consists of, in order from the object side to the image side: a first lens unit L1 having a positive refractive power; a second lens unit L2 having a negative refractive power; a third lens unit L3 having a positive refractive power; and a fourth lens unit L4 having a positive refractive power. The aperture stop SP is arranged closest to the object side in the third lens unit.

Specifically, for zooming from the wide-angle end to the telephoto end, all the lens units are configured to move toward the object side. During the zooming, an interval between the first lens unit L1 and the second lens unit L2 is increased, an interval between the second lens unit L2 and the third lens unit L3 is reduced, and an interval between the third lens unit L3 and the fourth lens unit L4 is reduced.

During focusing from the object at infinity to the object at the closest distance, the second lens unit L2 is configured to move toward the object side.

The first lens unit L1 consists of, in order from the object side to the image side, the negative lens G1n, the positive lens G2p, and the positive lens G3p. The positive lens Gfp is a lens arranged as the third lens of the fourth lens unit L4 as counted from the object side, and the positive lens Grp is a lens arranged closest to the image side in the zoom lens ZL.

With the above-mentioned configuration, there can be obtained the zoom lens that is compact and is capable of correcting chromatic aberration of magnification over the entire zoom range as illustrated in the aberration diagrams of FIG. 8A and FIG. 8B.

Example 5

Figure 9:
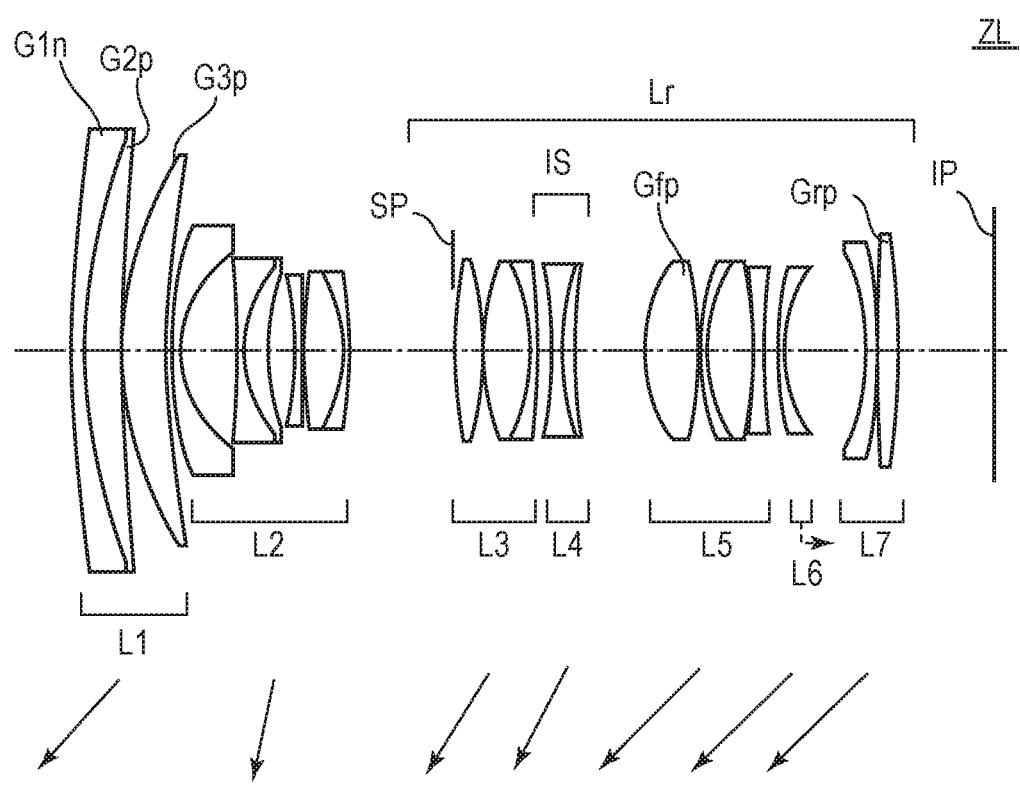
FIG. 9 is a cross-sectional view of a zoom lens according to Example 5 of the present invention.
Figure 10A:
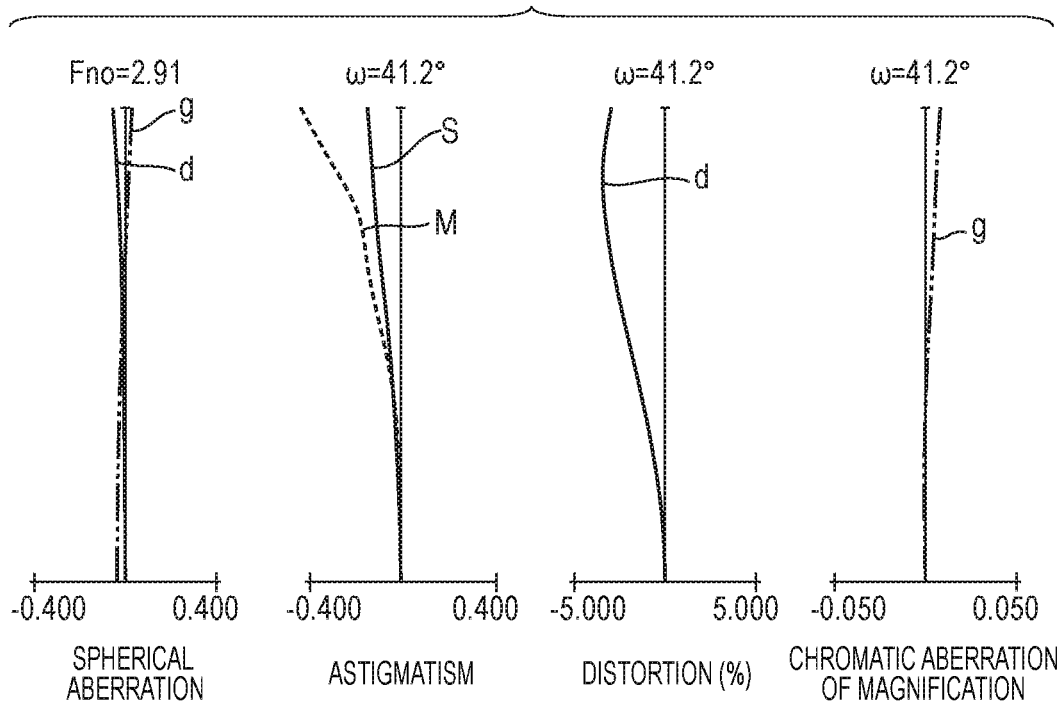
FIG. 10A is an aberration diagram of the zoom lens according to Example 5 when focused at infinity at a wide-angle end.
Figure 10B:
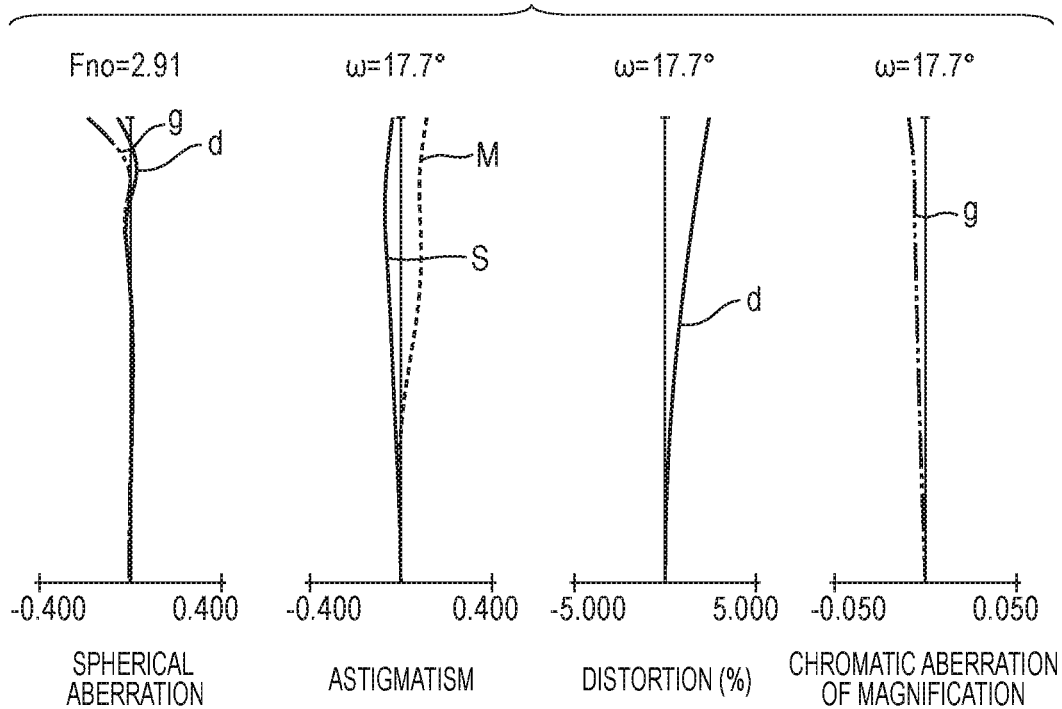
FIG. 10B is an aberration diagram of the zoom lens according to Example 5 when focused at infinity at a telephoto end.

FIG. 9 is a cross-sectional view of a zoom lens ZL according to Example 5 of the present invention, FIG. 10A is an aberration diagram of the zoom lens ZL when the zoom lens ZL is focused at infinity at the wide-angle end, and FIG. 10B is an aberration diagram of the zoom lens ZL when the zoom lens ZL is focused at infinity at the telephoto end.

The zoom lens ZL according to Example 5 consists of, in order from the object side to the image side: a first lens unit L1 having a positive refractive power; a second lens unit L2 having a negative refractive power; a third lens unit L3 having a positive refractive power; a fourth lens unit L4 having a negative refractive power; a fifth lens unit L5 having a positive refractive power; a sixth lens unit L6 having a negative refractive power; and a seventh lens unit L7 having a positive refractive power. The aperture stop SP is arranged closest to the object side in the third lens unit.

Specifically, for zooming from the wide-angle end to the telephoto end, all the lens units are configured to move toward the object side. During the zooming, an interval between the first lens unit L1 and the second lens unit L2 is increased, an interval between the second lens unit L2 and the third lens unit L3 is reduced, an interval between the third lens unit L3 and the fourth lens unit L4 is increased, an interval between the fourth lens unit L4 and the fifth lens unit L5 is reduced, an interval between the fifth lens unit L5 and the sixth lens unit L6 is reduced, and an interval between the sixth lens unit L6 and the seventh lens unit L7 is increased.

During focusing from the object at infinity to the object at the closest distance, the sixth lens unit L6 is configured to move toward the image side. During image blur correction, the fourth lens unit L4 is configured to move in a direction containing a component in a direction perpendicular to the optical axis.

The first lens unit L1 consists of, in order from the object side to the image side, the negative lens G1n, the positive lens G2p, and the positive lens G3p. The positive lens Gfp is a lens arranged adjacent to, and on the image side of, a subunit IS, and the positive lens Grp is a lens arranged closest to the image side in the zoom lens ZL.

With the above-mentioned configuration, there can be obtained the zoom lens that is compact and is capable of correcting chromatic aberration of magnification over the entire zoom range as illustrated in the aberration diagrams of FIG. 10A and FIG. 10B.

Exemplary Examples of the zoom lens of the present invention are described above, but the zoom lens of the present invention is not limited to those Examples and can be modified and changed variously within the scope of the gist thereof.

Numerical Examples

Now, descriptions are made of Numerical Examples 1 to 5 each correspond to Examples 1 to 5. Moreover, in Numerical Examples 1 to 5, a surface number indicates the order of an optical surface from the object side. Further, r represents a curvature radius (mm) of an optical surface, d represents an interval (mm) between adjacent optical surfaces, nd represents a refractive index of a material of an optical member with respect to the d-line, and vd represents an Abbe number of a material of an optical member with respect to the d-line. When Ng, NF, Nd, and NC represent refractive indices with respect to the g-line (wavelength: 435.8 nm), the F-line (486.1 nm), the d-line (587.6 nm), and the C-line of the Fraunhofer lines, respectively, the Abbe number vd is defined by the following expression.

$vd=(Nd/1)/(NF/NC)$

Symbol BF represents the back focus.

An aspherical surface is indicated by adding an asterisk (*) to the right of the surface number in each of Numerical Examples. When an optical axis direction is an X-axis, a direction perpendicular to the optical axis is an H axis, a light traveling direction is positive, R represents a paraxial curvature radius, K represents a conic constant, and B, C, D, E, and F represent aspherical coefficients, an aspherical surface shape is expressed by the following expression.

$$X = \frac{H^2/R}{1+\sqrt{1-(1+K)(H/R)^2}} + A4 \cdot H^4 + A6 \cdot H^6 + A8 \cdot H^8 + A10 \cdot H^{10} + A12 \cdot H^{12}$$

In each of the aspherical coefficients, e±x means ×10±x.

Values corresponding to the conditional expressions (1) to (15) in each of Numerical Examples 1 to 5 are shown in Table 1.

Numerical Example 1

Unit: mm

Surface data

| Surface number | r | d | nd | vd | Effective diameter |
|---|---|---|---|---|---|
| 1 | 234.000 | 2.10 | 1.80810 | 22.8 | 61.82 |
| 2 | 102.222 | 5.39 | 1.65160 | 58.5 | 60.07 |
| 3 | 1,002.275 | 0.15 | | | 59.72 |
| 4 | 70.728 | 5.94 | 1.65160 | 58.5 | 57.39 |
| 5 | 263.788 | (Variable) | | | 56.59 |
| 6* | 53.891 | 1.50 | 1.91082 | 35.3 | 33.28 |
| 7* | 17.511 | 7.24 | | | 25.65 |
| 8 | −89.151 | 1.20 | 1.83481 | 42.7 | 24.47 |
| 9 | 18.308 | 6.18 | 1.92119 | 24.0 | 21.52 |
| 10 | −113.117 | 1.99 | | | 20.26 |
| 11 | −25.280 | 1.20 | 1.62041 | 60.3 | 19.65 |
| 12 | −198.845 | (Variable) | | | 21.03 |
| 13 (Stop) | ∞ | 0.39 | | | 23.05 |
| 14 | 27.080 | 5.79 | 1.53775 | 74.7 | 25.69 |
| 15 | −119.898 | 0.15 | | | 25.74 |
| 16 | 37.308 | 3.51 | 1.76802 | 49.2 | 25.50 |
| 17* | 733.132 | 3.46 | | | 25.01 |
| 18 | −44.437 | 1.20 | 1.91082 | 35.3 | 23.93 |
| 19 | 18.367 | 7.05 | 1.64766 | 38.1 | 23.68 |
| 20 | −536.395 | (Variable) | | | 24.30 |
| 21 | 28.116 | 5.56 | 1.59522 | 67.7 | 25.91 |
| 22 | −137.421 | 0.15 | | | 25.61 |
| 23 | 31.020 | 1.10 | 2.00100 | 29.1 | 25.90 |
| 24 | 17.460 | 7.68 | 1.58313 | 59.4 | 24.54 |
| 25* | −100.096 | (Variable) | | | 24.45 |
| 26 | −527.022 | 2.91 | 2.00100 | 29.1 | 24.44 |
| 27 | −42.249 | 1.50 | 1.85400 | 40.4 | 24.47 |
| 28* | 60.010 | (Variable) | | | 24.35 |
| 29 | −18.813 | 1.40 | 1.77250 | 49.6 | 26.67 |
| 30 | −47.244 | 0.15 | | | 30.78 |
| 31 | 124.255 | 4.40 | 1.76182 | 26.5 | 35.40 |
| 32 | −93.259 | (Variable) | | | 36.00 |
| Image plane | ∞ | | | | |

Aspherical surface data

Sixth surface

K = 0.00000e+000   A4 = −1.42814e−006   A6 = 4.56859e−008
A8 = −1.41731e−010   A10 = 1.88542e−013

Seventh surface

K = 0.00000e+000   A4 = −5.94471e−006   A6 = 4.51548e−008

Seventeenth surface

K = 0.00000e+000   A4 = 2.00066e−006   A6 = −1.04974e−008
A8 = 1.91606e−012   A10 = −6.47401e−014

Twenty-fifth surface

K = 0.00000e+000   A4 = 1.87555e−005   A6 = 1.45857e−008
A8 = −8.18426e−011   A10 = 5.26187e−013

Thirty-eighth surface

K = 0.00000e+000   A4 = −1.34460e−006   A6 = −8.69731e−009
A8 = 6.53417e−011   A10 = −2.51887e−013

Various data
Zoom ratio 5.30

| | Wide angle | Intermediate | Telephoto |
|---|---|---|---|
| Focal length | 24.72 | 58.45 | 131.00 |
| F-number | 4.12 | 4.12 | 4.12 |
| Half angle of view (degrees) | 41.19 | 20.31 | 9.38 |
| Image height | 21.64 | 21.64 | 21.64 |
| Total lens length | 137.50 | 168.99 | 200.49 |
| BF | 13.50 | 25.49 | 31.74 |
| d5 | 0.70 | 28.53 | 53.13 |
| d12 | 18.75 | 8.29 | 2.50 |
| d20 | 8.43 | 4.49 | 1.00 |
| d25 | 1.80 | 1.79 | 1.50 |
| d28 | 15.03 | 21.11 | 31.32 |
| d32 | 13.50 | 25.49 | 31.74 |

Lens unit data

| Unit | First surface | Focal length |
|---|---|---|
| 1 | 1 | 124.23 |
| 2 | 6 | −16.77 |
| 3 | 13 | 52.56 |
| 4 | 21 | 26.43 |
| 5 | 26 | −78.97 |
| 6 | 29 | −111.09 |

Numerical Example 2

Unit: mm

Surface data

| Surface number | r | d | nd | vd | Effective diameter |
|---|---|---|---|---|---|
| 1 | 266.275 | 1.80 | 1.80810 | 22.8 | 63.00 |
| 2 | 93.368 | 6.52 | 1.72916 | 54.7 | 61.29 |
| 3 | ∞ | 0.15 | | | 60.87 |
| 4 | 49.826 | 6.97 | 1.72916 | 54.7 | 55.94 |
| 5 | 126.155 | (Variable) | | | 54.73 |
| 6 | 65.832 | 1.25 | 1.95375 | 32.3 | 31.37 |
| 7 | 15.019 | 8.19 | | | 23.43 |
| 8* | −33.476 | 1.10 | 1.58313 | 59.4 | 22.88 |
| 9* | 65.137 | 0.15 | | | 21.96 |
| 10 | 40.325 | 5.03 | 1.80810 | 22.8 | 21.71 |
| 11 | −40.325 | 0.97 | | | 20.83 |
| 12 | −25.491 | 1.00 | 1.80400 | 46.6 | 20.55 |
| 13 | −63.435 | (Variable) | | | 20.09 |
| 14 (Stop) | ∞ | 0.30 | | | 19.35 |
| 15 | 44.965 | 2.30 | 1.91082 | 35.3 | 19.94 |
| 16 | ∞ | 0.15 | | | 19.93 |
| 17 | 21.533 | 1.00 | 1.95375 | 32.3 | 19.90 |
| 18 | 13.108 | 6.76 | 1.59522 | 67.7 | 18.66 |
| 19 | −795.231 | 1.37 | | | 18.10 |
| 20 | −152.936 | 0.80 | 1.74951 | 35.3 | 17.70 |
| 21 | 16.038 | 2.88 | 2.00069 | 25.5 | 17.20 |
| 22 | 30.717 | 3.81 | 1.78472 | 25.7 | 16.77 |
| 23 | 76.401 | 0.75 | | | 16.79 |
| 24 | 19.110 | 3.57 | 1.49700 | 81.5 | 16.59 |
| 25 | ∞ | 0.15 | | | 16.72 |
| 26* | 24.461 | 7.26 | 1.58313 | 59.4 | 18.62 |
| 27* | −25.212 | (Variable) | | | 19.76 |
| 28 | 121.315 | 0.75 | 1.72916 | 54.7 | 19.99 |
| 29 | 23.846 | (Variable) | | | 19.90 |
| 30* | −43.071 | 1.50 | 1.76450 | 49.1 | 24.17 |
| 31* | −248.821 | (Variable) | | | 27.13 |
| 32 | −68.116 | 4.50 | 1.80400 | 46.6 | 35.10 |
| 33 | −32.318 | (Variable) | | | 36.00 |
| Image plane | ∞ | | | | |

Aspherical surface data

Eighth surface

K = 0.00000e+000   A4 = 5.17863e−006   A6 = −6.74704e−008
A8 = 5.22888e−010   A10 = −4.25942e−012   A12 = 1.45835e−014

Ninth surface

K = 0.00000e+000   A4 = −7.77410e−006   A6 = −4.92259e−008

-continued

Unit: mm

Twenty-sixth surface

K = 0.00000e+000  A4 = −2.73692e−005  A6 = 5.32572e−008
A8 = −8.44820e−010  A10 = 5.56287e−012
Twenty-seventh surface K = 0.00000e+000  A4 = 1.47893e−005  A6 = 2.32565e−009
A8 = −6.75778e−010  A10 = 4.79574e−012
Thirtieth surface K = 0.00000e+000  A4 = −8.05959e−005  A6 = 1.99191e−007
A8 = −1.06561e−009  A10 = −7.47195e−013  A12 = 8.67762e−015
Thirty-first surface K = 0.00000e+000  A4 = −7.18829e−005  A6 = 2.81391e−007
A8 = −1.44320e−009  A10 = 4.20650e−012  A12 = −5.37088e−015

Various data
Zoom ratio 4.12

|  | Wide angle | Intermediate | Telephoto |
|---|---|---|---|
| Focal length | 24.72 | 50.92 | 101.84 |
| F-number | 4.12 | 4.12 | 4.12 |
| Half angle of view (degrees) | 41.19 | 23.02 | 11.99 |
| Image height | 21.64 | 21.64 | 21.64 |
| Total lens length | 125.34 | 142.50 | 169.34 |
| BF | 17.88 | 19.75 | 30.96 |
| d5 | 0.75 | 15.82 | 34.38 |
| d13 | 21.53 | 9.07 | 2.38 |
| d27 | 1.80 | 3.37 | 1.40 |
| d29 | 11.59 | 10.02 | 11.99 |
| d31 | 0.80 | 13.48 | 17.24 |
| d33 | 17.88 | 19.75 | 30.96 |

Lens unit data

| Unit | First surface | Focal length |
|---|---|---|
| 1 | 1 | 88.25 |
| 2 | 6 | −18.38 |
| 3 | 14 | 24.16 |
| 4 | 28 | −40.84 |
| 5 | 30 | −68.35 |
| 6 | 32 | 72.42 |

Numerical Example 3

Unit: mm

Surface data

| Surface number | r | d | nd | vd | Effective diameter |
|---|---|---|---|---|---|
| 1 | 392.310 | 2.10 | 1.80810 | 22.8 | 68.00 |
| 2 | 127.503 | 4.67 | 1.72916 | 54.7 | 65.23 |
| 3 | 667.842 | 0.15 |  |  | 64.73 |
| 4 | 54.884 | 7.42 | 1.72916 | 54.7 | 59.43 |
| 5 | 153.255 | (Variable) |  |  | 58.10 |
| 6 | 64.348 | 1.40 | 1.83481 | 42.7 | 36.58 |
| 7 | 17.048 | 7.44 |  |  | 27.32 |
| 8 | 27,996.689 | 1.20 | 1.59522 | 67.7 | 26.70 |
| 9 | 18.868 | 3.95 | 1.85478 | 24.8 | 23.49 |
| 10 | 39.686 | 3.55 |  |  | 22.42 |
| 11 | −43.850 | 1.20 | 1.58313 | 59.4 | 21.97 |
| 12* | −173.426 | 0.15 |  |  | 21.36 |
| 13 | 355.894 | 5.77 | 1.59270 | 35.3 | 20.90 |
| 14 | −18.473 | 1.10 | 1.88300 | 40.8 | 21.75 |
| 15 | −58.258 | (Variable) |  |  | 23.67 |
| 16 (Stop) | ∞ | 0.40 |  |  | 26.23 |
| 17 | 87.834 | 3.83 | 1.76385 | 48.5 | 27.24 |
| 18 | −65.580 | 0.15 |  |  | 27.54 |
| 19 | 40.015 | 7.30 | 1.59522 | 67.7 | 27.85 |
| 20 | −36.554 | 1.10 | 2.00069 | 25.5 | 27.36 |
| 21 | −129.446 | 2.47 |  |  | 27.32 |
| 22* | −51.044 | 1.50 | 1.58313 | 59.4 | 26.96 |
| 23 | 43.427 | 1.99 | 1.72825 | 28.5 | 27.07 |
| 24 | 76.138 | (Variable) |  |  | 27.03 |
| 25 | 27.612 | 6.78 | 1.49700 | 81.5 | 28.84 |
| 26 | −136.151 | 0.15 |  |  | 28.31 |
| 27 | 41.980 | 4.39 | 1.49700 | 81.5 | 28.27 |
| 28 | −214.494 | 0.15 |  |  | 27.93 |
| 29 | 44.999 | 6.97 | 1.49700 | 81.5 | 26.82 |
| 30 | −32.436 | 1.50 | 1.85400 | 40.4 | 25.72 |
| 31* | 3,044.402 | (Variable) |  |  | 24.76 |
| 32 | 237.728 | 0.90 | 1.95375 | 32.3 | 24.75 |
| 33 | 31.850 | (Variable) |  |  | 24.60 |
| 34* | −55.904 | 1.40 | 1.58313 | 59.4 | 29.07 |
| 35* | 68,002.899 | 0.15 |  |  | 32.08 |
| 36 | 178.752 | 5.17 | 2.00069 | 25.5 | 34.33 |
| 37 | −55.299 | 1.40 | 1.88300 | 40.8 | 34.95 |
| 38 | −102.512 | (Variable) |  |  | 36.01 |
| Image plane | ∞ |  |  |  |  |

Aspherical surface data

Twelfth surface

K = 0.00000e+000  A4 = −7.73015e−006  A6 = −2.45711e−009
A8 = −1.36991e−010  A10 = 8.92197e−013  A12 = −3.17289e−015
Twenty-second surface K = 0.00000e+000  A4 = 4.13779e−006  A6 = 3.95825e−009
A8 = 1.25042e−011  A10 = −1.79610e−013  A12 = 3.88483e−016
Thirty-first surface K = 0.00000e+000  A4 = 2.42610e−005  A6 = 7.09586e−009
A8 = 3.65492e−011  A10 = −1.07614e−013  A12 = 9.63094e−016
Thirty-fourth surface K = 0.00000e+000  A4 = −6.77153e−006  A6 = −3.91035e−008
A8 = −1.11068e−011  A10 = −1.77528e−013  A12 = −1.39223e−016
Thirty-fifth surface K = 0.00000e+000  A4 = −7.20605e−006  A6 = −2.55759e−008

Various data
Zoom ratio 2.75

|  | Wide angle | Intermediate | Telephoto |
|---|---|---|---|
| Focal length | 24.72 | 45.33 | 67.89 |
| F-number | 2.88 | 2.88 | 2.88 |
| Half angle of view (degrees) | 41.19 | 25.51 | 17.68 |
| Image height | 21.64 | 21.64 | 21.64 |
| Total lens length | 144.51 | 160.46 | 176.40 |
| BF | 15.00 | 26.31 | 35.56 |
| d5 | 0.80 | 18.69 | 29.07 |
| d15 | 15.62 | 6.31 | 2.49 |
| d24 | 13.16 | 8.12 | 6.11 |
| d31 | 1.50 | 2.09 | 1.49 |
| d33 | 10.63 | 11.14 | 13.87 |
| d38 | 15.00 | 26.31 | 35.56 |

Lens unit data

| Unit | First surface | Focal length |
|---|---|---|
| 1 | 1 | 109.80 |
| 2 | 6 | −17.10 |
| 3 | 16 | 51.53 |
| 4 | 25 | 27.65 |
| 5 | 32 | −38.64 |
| 6 | 34 | 160.61 |

Numerical Example 4

Unit: mm

Surface data

| Surface number | r | d | nd | vd | Effective diameter |
|---|---|---|---|---|---|
| 1 | 983.117 | 2.20 | 1.89286 | 20.4 | 70.24 |
| 2 | 120.082 | 6.45 | 1.80400 | 46.6 | 67.51 |
| 3 | −1,883.254 | 0.15 | | | 66.97 |
| 4 | 56.827 | 6.08 | 1.83481 | 42.7 | 59.58 |
| 5 | 121.126 | (Variable) | | | 58.36 |
| 6* | 153.722 | 1.40 | 1.88300 | 40.8 | 36.81 |
| 7 | 21.563 | 9.01 | | | 28.82 |
| 8 | −42.882 | 1.05 | 1.59522 | 67.7 | 27.11 |
| 9 | 30.354 | 5.08 | 1.85478 | 24.8 | 26.12 |
| 10 | −541.605 | 0.52 | | | 26.71 |
| 11 | −7,005.428 | 5.97 | 1.67542 | 34.8 | 27.07 |
| 12 | −26.046 | 1.10 | 1.88300 | 40.8 | 27.69 |
| 13 | −55.419 | 2.80 | | | 28.98 |
| 14 | −25.411 | 1.20 | 1.88300 | 40.8 | 29.03 |
| 15 | −45.296 | (Variable) | | | 31.31 |
| 16 (Stop) | ∞ | 1.90 | | | 33.71 |
| 17 | 43.651 | 7.10 | 1.59522 | 67.7 | 38.91 |
| 18 | −305.501 | 0.15 | | | 39.01 |
| 19* | 100.151 | 5.12 | 1.49700 | 81.5 | 39.02 |
| 20 | −160.893 | 0.15 | | | 38.66 |
| 21 | 105.624 | 4.99 | 1.43875 | 94.9 | 37.35 |
| 22 | −100.145 | 6.71 | | | 36.67 |
| 23 | −27.918 | 1.40 | 2.00100 | 29.1 | 34.73 |
| 24 | −69.855 | (Variable) | | | 36.95 |
| 25 | 68.659 | 6.55 | 1.59522 | 67.7 | 39.03 |
| 26 | −98.680 | 0.20 | | | 39.01 |
| 27 | 52.428 | 6.17 | 1.59522 | 67.7 | 37.50 |
| 28 | −184.881 | 0.20 | | | 37.07 |
| 29 | 41.236 | 10.99 | 1.43875 | 94.9 | 35.27 |
| 30 | −34.167 | 1.40 | 2.00100 | 29.1 | 33.94 |
| 31 | −52.555 | 0.20 | | | 33.88 |
| 32* | 52.119 | 1.20 | 1.85400 | 40.4 | 30.32 |
| 33 | 24.920 | 10.17 | | | 28.39 |
| 34 | −22.082 | 1.30 | 1.57135 | 53.0 | 28.56 |
| 35 | 175.610 | 4.94 | 2.00069 | 25.5 | 34.38 |
| 36 | −63.122 | (Variable) | | | 35.25 |
| Image plane | ∞ | | | | |

Aspherical surface data

Sixth surface

K = 0.00000e+000   A4 = 5.76266e−006   A6 = −3.93663e−009
A8 = 1.18134e−011   A10 = −2.44731e−014   A12 = 4.06164e−017

Nineteenth surface

K = 0.00000e+000   A4 = −5.02832e−007   A6 = 4.82186e−009
A8 = 2.64122e−013   A10 = −3.67074e−015   A12 = 3.42146e−017

Thirty-second surface

K = 0.00000e+000   A4 = −1.44518e−005   A6 = −2.24546e−008
A8 = 4.65187e−011   A10 = −2.35244e−013   A12 = 4.61523e−016

Various data
Zoom ratio 2.75

| | Wide angle | Intermediate | Telephoto |
|---|---|---|---|
| Focal length | 24.70 | 35.76 | 67.86 |
| F-number | 2.06 | 2.06 | 2.06 |
| Half angle of view (degrees) | 41.22 | 31.18 | 17.68 |
| Image height | 21.64 | 21.64 | 21.64 |
| Total lens length | 152.24 | 158.86 | 179.82 |
| BF | 12.93 | 19.69 | 30.66 |
| d5 | 3.52 | 13.78 | 34.37 |
| d15 | 15.06 | 8.15 | 0.21 |
| d24 | 6.87 | 3.39 | 0.73 |
| d36 | 12.93 | 19.69 | 30.66 |

Unit: mm

Lens unit data

| Unit | First surface | Focal length |
|---|---|---|
| 1 | 1 | 114.57 |
| 2 | 6 | −19.45 |
| 3 | 16 | 57.66 |
| 4 | 25 | 37.36 |

Numerical Example 5

Unit: mm

Surface data

| Surface number | r | d | nd | vd | Effective diameter |
|---|---|---|---|---|---|
| 1 | 232.357 | 2.10 | 1.80809 | 22.8 | 68.69 |
| 2 | 90.381 | 5.78 | 1.77250 | 49.6 | 65.95 |
| 3 | 323.713 | 0.15 | | | 65.38 |
| 4 | 59.139 | 7.05 | 1.72916 | 54.7 | 60.67 |
| 5 | 166.984 | (Variable) | | | 59.46 |
| 6 | 67.802 | 1.40 | 1.88300 | 40.8 | 38.53 |
| 7 | 18.663 | 8.67 | | | 29.19 |
| 8 | −115.164 | 1.20 | 1.49700 | 81.5 | 28.34 |
| 9 | 21.412 | 3.87 | 1.85478 | 24.8 | 24.87 |
| 10 | 47.653 | 4.17 | | | 23.86 |
| 11 | −48.039 | 1.00 | 1.72916 | 54.7 | 22.68 |
| 12 | 425.782 | 0.29 | | | 22.04 |
| 13 | 93.568 | 6.03 | 1.59270 | 35.3 | 21.73 |
| 14 | −24.518 | 1.05 | 1.83481 | 42.7 | 22.50 |
| 15 | −71.957 | (Variable) | | | 23.85 |
| 16 (Stop) | ∞ | 0.40 | | | 25.91 |
| 17 | 78.059 | 4.31 | 1.76385 | 48.5 | 26.86 |
| 18 | −59.447 | 0.15 | | | 27.13 |
| 19 | 40.155 | 7.40 | 1.49700 | 81.5 | 26.92 |
| 20 | −33.807 | 1.10 | 2.00069 | 25.5 | 26.27 |
| 21 | −143.919 | (Variable) | | | 26.33 |
| 22* | −63.149 | 1.65 | 1.58313 | 59.4 | 26.06 |
| 23 | 45.825 | 1.92 | 1.76182 | 26.5 | 26.27 |
| 24 | 84.251 | (Variable) | | | 26.24 |
| 25 | 26.393 | 8.28 | 1.49700 | 81.5 | 27.41 |
| 26 | −69.360 | 0.35 | | | 27.25 |
| 27 | 39.335 | 1.15 | 1.73800 | 32.3 | 26.90 |
| 28 | 26.899 | 7.03 | 1.53775 | 74.7 | 26.14 |
| 29 | −73.879 | 0.15 | | | 25.50 |
| 30* | −602.944 | 1.70 | 1.85400 | 40.4 | 25.28 |
| 31* | 131.941 | (Variable) | | | 24.90 |
| 32 | 60.209 | 0.90 | 1.80400 | 46.6 | 25.51 |
| 33 | 23.878 | (Variable) | | | 25.06 |
| 34* | −52.714 | 1.70 | 1.58313 | 59.4 | 29.85 |
| 35* | −3,211.285 | 0.15 | | | 32.97 |
| 36 | 317.277 | 3.23 | 2.00100 | 29.1 | 35.27 |
| 37 | −114.700 | (Variable) | | | 35.82 |
| Image plane | ∞ | | | | |

Aspherical surface data

Twenty-second surface

K = 0.00000e+000   A4 = 3.01280e−006   A6 = −9.03767e−010
A8 = 5.61555e−011   A10 = −4.27609e−013   A12 = 9.23668e−016

Thirtieth surface

K = 0.00000e+000   A4 = −5.55314e−005   A6 = 2.14060e−007
A8 = −4.57909e−011   A10 = −2.74784e−012   A12 = 6.52571e−015

Thirty-first surface

K = 0.00000e+000   A4 = −3.45440e−005   A6 = 2.65378e−007
A8 = −1.27555e−010   A10 = −2.40980e−012   A12 = 7.25838e−015

-continued

Unit: mm

Thirty-fourth surface

K = 0.00000e+000   A4 = −3.28022e−005   A6 = 1.26827e−007
A8 = −2.01507e−010  A10 = −1.63600e−012  A12 = 4.86504e−015

Thirty-fifth surface

K = 0.00000e+000   A4 = −3.30256e−005   A6 = 1.44829e−007
A8 = −5.66682e−010  A10 = 8.17897e−013   A12 = −2.19929e−016

Various data
Zoom ratio 2.75

|  | Wide angle | Intermediate | Telephoto |
|---|---|---|---|
| Focal length | 24.72 | 44.86 | 67.89 |
| F-number | 2.91 | 2.91 | 2.91 |
| Half angle of view (degrees) | 41.19 | 25.75 | 17.68 |
| Image height | 21.64 | 21.64 | 21.64 |
| Total lens length | 144.09 | 158.48 | 172.87 |
| BF | 14.37 | 26.78 | 35.69 |
| d5 | 0.80 | 17.98 | 29.93 |
| d15 | 16.15 | 7.07 | 2.40 |
| d21 | 2.26 | 2.23 | 2.54 |
| d24 | 11.08 | 4.97 | 2.87 |
| d31 | 2.16 | 1.42 | 1.33 |
| d33 | 12.96 | 13.70 | 13.79 |
| d37 | 14.37 | 26.78 | 35.69 |

Lens unit data

| Unit | First surface | Focal length |
|---|---|---|
| 1 | 1 | 113.48 |
| 2 | 6 | −18.58 |
| 3 | 16 | 35.84 |
| 4 | 22 | −69.07 |
| 5 | 25 | 28.29 |
| 6 | 32 | −49.77 |
| 7 | 34 | 785.94 |

TABLE 1

| Conditional Expression | Example 1 | Example 2 | Example 3 | Example 4 | Example 5 |
|---|---|---|---|---|---|
| (1) $15.00 < \nu d1n < 23.40$ | 22.76 | 22.76 | 22.76 | 20.36 | 22.76 |
| (2) $1.70 < ndrp < 2.20$ | 1.76 | 1.80 | 2.00 | 2.00 | 2.00 |
| (3) $1.50 < skt/skw < 2.60$ | 2.35 | 1.73 | 2.37 | 2.37 | 2.48 |
| (4) $1.60 < nd1p < 2.00$ | 1.65 | 1.73 | 1.73 | 1.82 | 1.75 |
| (5) $0.40 < \nu d1n/\nu drp < 1.00$ | 0.86 | 0.49 | 0.89 | 0.80 | 0.78 |
| (6) $0.80 < |f2|/skw < 1.80$ | 1.24 | 1.03 | 1.14 | 1.50 | 1.29 |
| (7) $2.30 < f1/skt < 4.70$ | 3.91 | 2.85 | 3.09 | 3.74 | 3.18 |
| (8) $0.40 < frp/ft < 1.40$ | 0.54 | 0.71 | 0.63 | 0.69 | 1.24 |
| (9) $3.00 < (Fnot \times f1)/ft < 5.50$ | 3.91 | 3.57 | 4.71 | 3.48 | 4.86 |
| (10) $0.50 < |f2|/fw < 1.00$ | 0.68 | 0.74 | 0.69 | 0.79 | 0.75 |
| (11) $3.80 < Lt/skt < 7.60$ | 6.32 | 5.47 | 4.96 | 5.86 | 4.84 |
| (12) $0.00 < (R1 + R2)/(R1 - R2) < 4.00$ | 0.14 | 2.81 | 0.53 | 0.47 | 0.47 |
| (13) $73.00 < \nu fp < 100.00$ | 74.70 | 81.54 | 81.54 | 94.93 | 81.54 |
| (14) $1.40 < ffp/fw < 2.00$ | 1.69 | 1.56 | 1.58 | 1.80 | 1.60 |
| (15) $0.05 < Lrp/Lw < 0.20$ | 0.10 | 0.14 | 0.11 | 0.08 | 0.10 |

[Embodiment of Image Pickup Apparatus]

Next, an image pickup apparatus according to an embodiment of the present invention, which uses the zoom lens according to any one of Examples of the present invention as a photographing optical system, is described with reference to FIG. 11. An image pickup apparatus 10 is a digital still camera, a video camera, a monitoring camera, a broadcasting camera, or other image pickup apparatus using an image pickup element, or a camera or other image pickup apparatus using a silver-halide photographic film, for example.

Figure 11:
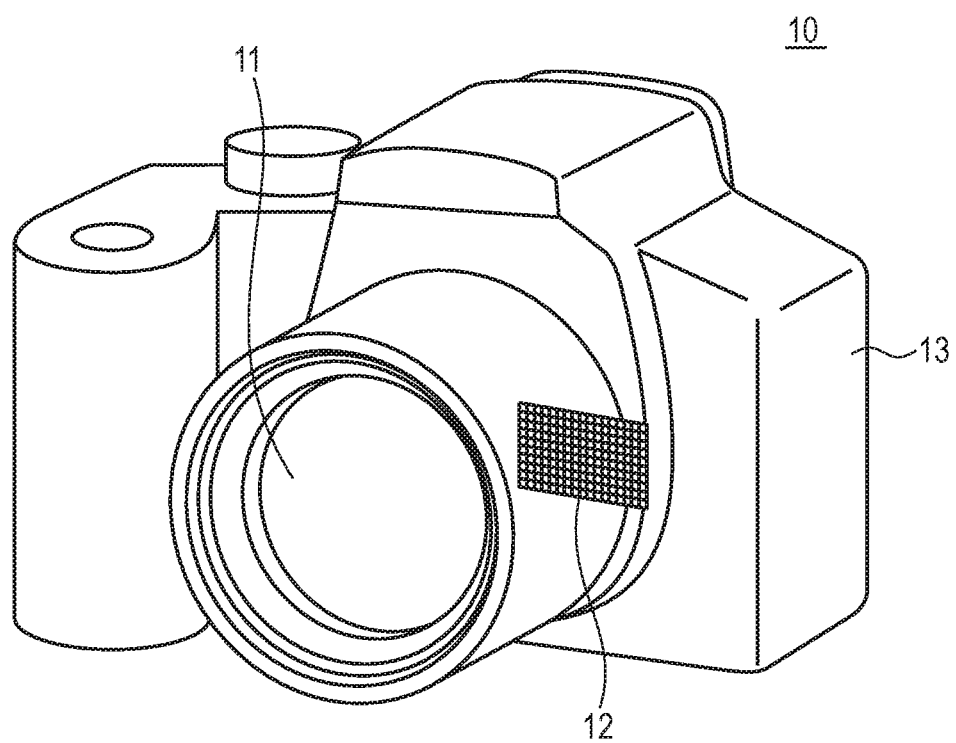
FIG. 11 is a view for illustrating a configuration of an image pickup apparatus.

In FIG. 11, the image pickup apparatus 10 includes: a photographing optical system 11, which is any one of the zoom lenses described in Examples 1 to 5; and a camera apparatus 13 including an image pickup element (photoelectric conversion element) 12, which is included in the image pickup apparatus 10 and is configured to receive an object image formed by the photographing optical system 11. The image pickup element 12 is a CCD sensor or a CMOS sensor, for example.

The zoom lens according to any one of Examples of the present invention can be applied to photographing optical systems of various image pickup apparatus as described above. As a result, there can be obtained the image pickup apparatus having a small size, a high zoom ratio, and high optical performance over the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-042214, filed Mar. 8, 2018 which is hereby incorporated by reference herein in its entirety.

What is claimed is:

1. A zoom lens comprising a plurality of lens units, and having a configuration in which an interval between each pair of adjacent lens units is changed for zooming,
the plurality of lens units consisting of, in order from an object side to an image side:
a first lens unit having a positive refractive power;
a second lens unit having a negative refractive power; and
a rear lens group including a plurality of lens units and having a positive refractive power as a whole,
the first lens unit being configured to move toward the object side for zooming from a wide-angle end to a telephoto end,
the first lens unit including a negative lens arranged closest to the object side, and a plurality of positive lenses, which are arranged on the image side of the negative lens and are made of materials each having an Abbe number that is larger than an Abbe number of a material of the negative lens,
wherein the rear lens group includes a third lens unit that has positive refractive power and is arranged closest to the object side in the rear lens group, wherein the rear lens group includes a lens unit that is arranged closest to the image side and includes a positive lens Grp, the positive lens Grp being a positive lens arranged closest to the image side among all positive lenses included in the rear lens group, wherein the rear lens group includes a positive lens Gfp that is arranged on the object side of the positive lens Grp and satisfies the following conditional expression $$73.00<vfp<100.00,$$

where vfp represents an Abbe number of a material of the positive lens Gfp, wherein the following conditional expressions are satisfied:

$$15.00<vd1n<23.40;$$

$$1.70<ndrp<2.20; \text{ and}$$

$$1.50<skt/skw<2.60,$$

$$00.80<|f2|/skw<1.80; \text{ and}$$

$$0.40<vd1n/vdrp\le 0.89,$$

where vd1n represents the Abbe number of the material of the negative lens, ndrp represents a refractive index of a material of the positive lens Grp with respect to a d-line, skw represents a back focus of the zoom lens at the wide-angle end, and skt represents a back focus of the zoom lens at the telephoto end, f2 represents a focal length of the second lens unit, vdrp represents an Abbe number of the material of the positive lens Grp .

2. The zoom lens according to claim 1, wherein the following conditional expression is satisfied:

$$1.60<nd1p<2.00,$$

where nd1p represents an average value of refractive indices of the materials of the plurality of positive lenses included in the first lens unit with respect to the d-line.

3. The zoom lens according to claim 1, wherein the following conditional expression is satisfied:

$$2.30<f1/skt<4.70,$$

where f1 represents a focal length of the first lens unit.

4. The zoom lens according to claim 1, wherein the following conditional expression is satisfied:

$$0.40<frp/ft<1.40,$$

where frp represents a focal length of the positive lens Grp, and ft represents a focal length of the zoom lens at the telephoto end.

5. The zoom lens according to claim 1, wherein the following conditional expression is satisfied:

$$3.00<(Fnot\times f1)/ft<5.50,$$

where Fnot represents an F-number of the zoom lens at the telephoto end, f1 represents a focal length of the first lens unit, and ft represents a focal length of the zoom lens at the telephoto end.

6. The zoom lens according to claim 1, wherein the following conditional expression is satisfied:

$$0.50<|f2|/fw<1.00,$$

where fw represents a focal length of the zoom lens at the wide-angle end.

7. The zoom lens according to claim 1, wherein the following conditional expression is satisfied:

$$3.80<Lt/skt<7.60,$$

where Lt represents a total lens length of the zoom lens at the telephoto end.

8. The zoom lens according to claim 1, wherein the following conditional expression is satisfied:

$$0.00<(R1+R2)/(R1-R2)<4.00,$$

where R1 represents a curvature radius of a lens surface on the object side of the positive lens Grp, and R2 represents a curvature radius of a lens surface on an image plane side of the positive lens Grp.

9. The zoom lens according to claim 1, wherein the following conditional expression is satisfied:

$$1.40<ffp/fw<2.00,$$

where ffp represents a focal length of the positive lens Gfp and fw represents a focal length of the zoom lens at the wide-angle end.

10. The zoom lens according to claim 1, wherein the following conditional expression is satisfied:

$$0.05<Lrp/Lw<0.20,$$

where Lrp represents a distance on an optical axis from a lens surface on the image side of the positive lens Grp to an image plane at the wide-angle end, and Lw represents a total lens length of the zoom lens at the wide-angle end.

11. The zoom lens according to claim 1, wherein an interval between the first lens unit and the second lens unit is increased for zooming from the wide-angle end to the telephoto end.

12. The zoom lens according to claim 1, wherein the rear lens group consists of, in order from the object side to the image side:
the third lens unit;
a fourth lens unit having a positive refractive power;
a fifth lens unit having a negative refractive power; and
a sixth lens unit having a negative refractive power.

13. The zoom lens according to claim 1, wherein the rear lens group consists of, in order from the object side to the image side:
the third lens unit;
a fourth lens unit having a negative refractive power;
a fifth lens unit having a negative refractive power; and
a sixth lens unit having a positive refractive power.

14. The zoom lens according to claim 1, wherein the rear lens group consists of, in order from the object side to the image side:
the third lens unit;
a fourth lens unit having a positive refractive power;
a fifth lens unit having a negative refractive power; and
a sixth lens unit having a positive refractive power.

15. The zoom lens according to claim 1, wherein the rear lens group consists of, in order from the object side to the image side:
the third lens unit; and
a fourth lens unit having a positive refractive power.

16. The zoom lens according to claim 1, wherein the rear lens group consists of, in order from the object side to the image side:
the third lens unit;
a fourth lens unit having a negative refractive power;
a fifth lens unit having a positive refractive power;
a sixth lens unit having a negative refractive power; and
a seventh lens unit having a positive refractive power.

17. An image pickup apparatus comprising:
a zoom; and
an image pickup element configured to receive an image formed by the zoom lens,
wherein the zoom lens comprising a plurality of lens units, and having a configuration in which an interval between each pair of adjacent lens units is changed for zooming,
the plurality of lens units consisting of, in order from an object side to an image side:
a first lens unit having a positive refractive power;
a second lens unit having a negative refractive power; and
a rear lens group including a plurality of lens units and having a positive refractive power as a whole,
the first lens unit being configured to move toward the object side for zooming from a wide-angle end to a telephoto end,
the first lens unit including a negative lens arranged closest to the object side, and a plurality of positive lenses, which are arranged on the image side of the negative lens and are made of materials each having an Abbe number that is larger than an Abbe number of a material of the negative lens,
wherein the rear lens group includes a third lens unit that has positive refractive power and is arranged closest to the object side in the rear lens group,
the rear lens group including a lens unit that is arranged closest to the image side and includes a positive lens Grp, the positive lens Grp being a positive lens arranged closest to the image side among all positive lenses included in the rear lens group,
wherein the rear lens group includes a positive lens Gfp that is arranged on the object side of the positive lens Grp and satisfies the following conditional expression:

$73.00 < vfp < 100.00$, wherein the vfp represents an Abbe number of a material of the positive lens Gfp,
wherein the following conditional expressions are satisfied:

$15.00 < vd1n < 23.40$;

$1.70 < ndrp < 2.20$;

$1.50 < skt/skw < 2.60$, $0.80 < |f2|/skw < 1.80$; and $0.40 < vd1n/vdrp \leq 0.89$, where vd1n represents the Abbe number of the material of the negative lens, ndrp represents a refractive index of a material of the positive lens Grp with respect to a d-line, skw represents a back focus of the zoom lens at the wide-angle end, skt represents a back focus of the zoom lens at the telephoto end, f2 represents a focal length of the second lens unit, vdrp represents an Abbe number of the material of the positive lens Grp.

* * * * *